(12) United States Patent
Nakamura et al.

(10) Patent No.: US 8,139,150 B2
(45) Date of Patent: Mar. 20, 2012

(54) METHOD AND APPARATUS FOR ENCODING AND DECODING MULTI-VIEW VIDEO SIGNAL, AND RELATED COMPUTER PROGRAMS

(75) Inventors: Hiroya Nakamura, Kanagawa-ken (JP);
Motoharu Ueda, Kanagawa-ken (JP)

(73) Assignee: Victor Company of Japan, Ltd., Yokohama (JP)

( * ) Notice: Subject to any disclaimer, the term of this patent is extended or adjusted under 35 U.S.C. 154(b) by 1196 days.

(21) Appl. No.: 11/907,188

(22) Filed: Oct. 10, 2007

(65) Prior Publication Data
US 2008/0089428 A1      Apr. 17, 2008

(30) Foreign Application Priority Data

Oct. 13, 2006   (JP) .................................. 2006-279364
Dec. 28, 2006   (JP) .................................. 2006-354878
Oct. 5, 2007    (JP) .................................. 2007-261773

(51) Int. Cl.
*H04N 7/12*          (2006.01)
(52) U.S. Cl. ................................ 348/409.1; 375/240.15
(58) Field of Classification Search .................... 348/48, 348/409, 409.1; 375/240.15
See application file for complete search history.

(56) References Cited

U.S. PATENT DOCUMENTS

6,055,012 A *   4/2000  Haskell et al. .................. 348/48
2007/0171976 A1*  7/2007  Toma et al. ............... 375/240.15

FOREIGN PATENT DOCUMENTS

JP   61-144191   7/1986
JP   06-098312   4/1994

OTHER PUBLICATIONS

Joint Draft 1.0 on Multiview Video Coding, Joint Video Team of ISO/IEC MPEG & ITU-T VCEG, JVT-U209, Nov. 2006.

* cited by examiner

*Primary Examiner* — Ricky Ngo
*Assistant Examiner* — Phuongchau B Nguyen
(74) *Attorney, Agent, or Firm* — Louis Woo

(57) ABSTRACT

A multi-view video signal is encoded. The multi-view video signal includes picture signals corresponding to different viewpoints respectively. One among the viewpoints is designated as a base viewpoint. The base viewpoint corresponds to a picture signal which is encoded without referring to at least one picture signal corresponding to one of the viewpoints except the base viewpoint. There is determined a desired delay time of the start of decoding a coded signal originating from each of the picture signals corresponding to the viewpoints except the base viewpoint relative to the start of decoding a coded signal originating from the picture signal corresponding to the base viewpoint. Information representing the determined delay time is generated. Then, the generated information is encoded.

4 Claims, 23 Drawing Sheets

FIG. 4

| VIEWPOINT ID | VIEW DEPENDENCY COUNT |
|---|---|
| 0 | 0 |
| 1 | 2 |
| 2 | 1 |
| 3 | 3 |
| 4 | 2 |
| 5 | 4 |
| 6 | 3 |
| 7 | 4 |

FIG. 5

| ...... (OMITTED) | |
|---|---|
| num_views_minus1 | 8bit |
| for (i=0;i<=num_views_minus1;i++){ | |
| view_dependency[i] | 8bit |
| } | |
| ...... (OMITTED) | |

FIG. 6

| ......(OMITTED) | 00000111 8bit | 00000000 8bit | 00000010 8bit | 00000001 8bit | 00000011 8bit | 00000010 8bit | 00000100 8bit | 00000011 8bit | 00000100 8bit | ......(OMITTED) |
|---|---|---|---|---|---|---|---|---|---|---|
| | num_views_minus1 | view_dependency[0] | view_dependency[1] | view_dependency[2] | view_dependency[3] | view_dependency[4] | view_dependency[5] | view_dependency[6] | view_dependency[7] | |

| ········ (OMITTED) | |
|---|---|
| view_id | 8bit |
| view_dependency | 8bit |
| ········ (OMITTED) | |

FIG. 17

| seq_parameter_set_mvc_extension ( ) { | BIT LENGTH |
|---|---|
| num_views_minus1 | INTEGER WITHOUT SIGN EXPONENTIAL GOLOMB CODE |
| for (i=0;i<=num_views_minus1;i++){ | |
| num_anchor_refs_l0[i] | INTEGER WITHOUT SIGN EXPONENTIAL GOLOMB CODE |
| for (j=0;j<num_anchor_refs_l0[i];j++) | |
| anchor_ref_l0[i][j] | INTEGER WITHOUT SIGN EXPONENTIAL GOLOMB CODE |
| num_anchor_refs_l1[i] | INTEGER WITHOUT SIGN EXPONENTIAL GOLOMB CODE |
| for (j=0;j<num_anchor_refs_l1[i];j++) | |
| anchor_ref_l1[i][j] | INTEGER WITHOUT SIGN EXPONENTIAL GOLOMB CODE |
| } | |
| for (i=0;i<=num_views_minus1;i++){ | |
| num_anchor_refs_l0[i] | INTEGER WITHOUT SIGN EXPONENTIAL GOLOMB CODE |
| for (j=0;j<num_anchor_refs_l0[i];j++) | |
| non_anchor_ref_l0[i][j] | INTEGER WITHOUT SIGN EXPONENTIAL GOLOMB CODE |
| num_non_anchor_refs_l1[i] | INTEGER WITHOUT SIGN EXPONENTIAL GOLOMB CODE |
| for (i=0;j<num_non_anchor_refs_l1[i];j++) | |
| non_anchor_ref_l1[i][j] | INTEGER WITHOUT SIGN EXPONENTIAL GOLOMB CODE |
| } | |

FIG. 18

| SYNTAX ELEMENT | VALUE |
|---|---|
| num_views_minus1 | 7 |
| num_anchor_refs_l0[0] | 0 |
| num_anchor_refs_l1[0] | 0 |
| num_anchor_refs_l0[1] | 2 |
| anchor_ref_l0[1][0] | 0 |
| anchor_ref_l0[1][1] | 2 |
| num_anchor_refs_l1[1] | 2 |
| anchor_ref_l1[1][0] | 2 |
| anchor_ref_l1[1][1] | 0 |
| num_anchor_refs_l0[2] | 1 |
| anchor_ref_l0[2][0] | 0 |
| num_anchor_refs_l1[2] | 0 |
| num_anchor_refs_l0[3] | 2 |
| anchor_ref_l0[3][0] | 2 |
| anchor_ref_l0[3][1] | 4 |
| num_anchor_refs_l1[3] | 2 |
| anchor_ref_l1[3][0] | 4 |
| anchor_ref_l1[3][1] | 2 |

| SYNTAX ELEMENT | VALUE |
|---|---|
| num_anchor_refs_l0[4] | 1 |
| anchor_ref_l0[4][0] | 2 |
| num_anchor_refs_l1[4] | 0 |
| num_anchor_refs_l0[5] | 2 |
| anchor_ref_l0[5][0] | 4 |
| anchor_ref_l0[5][1] | 6 |
| num_anchor_refs_l1[5] | 2 |
| anchor_ref_l1[5][0] | 6 |
| anchor_ref_l1[5][1] | 4 |
| num_anchor_refs_l0[6] | 1 |
| anchor_ref_l0[6][0] | 4 |
| num_anchor_refs_l1[6] | 0 |
| num_anchor_refs_l0[7] | 1 |
| anchor_ref_l0[7][0] | 6 |
| num_anchor_refs_l1[7] | 0 |

| SYNTAX ELEMENT | VALUE |
|---|---|
| num_non_anchor_refs_l0[0] | 2 |
| non_anchor_ref_l0[0][0] | 0 |
| non_anchor_ref_l0[0][1] | 2 |
| num_non_anchor_refs_l1[0] | 0 |
| num_non_anchor_refs_l0[1] | 2 |
| non_anchor_ref_l0[1][0] | 0 |
| non_anchor_ref_l0[1][1] | 2 |
| num_non_anchor_refs_l1[1] | 1 |
| non_anchor_ref_l1[1][0] | 0 |
| num_non_anchor_refs_l0[2] | 2 |
| non_anchor_ref_l0[2][0] | 2 |
| non_anchor_ref_l0[2][1] | 2 |
| num_non_anchor_refs_l1[2] | 2 |
| non_anchor_ref_l1[2][0] | 2 |
| non_anchor_ref_l1[2][1] | 3 |
| num_non_anchor_refs_l0[3] | 2 |
| non_anchor_ref_l0[3][0] | 2 |
| non_anchor_ref_l0[3][1] | 3 |
| num_non_anchor_refs_l1[3] | 4 |

| SYNTAX ELEMENT | VALUE |
|---|---|
| num_non_anchor_refs_l0[4] | 2 |
| non_anchor_ref_l0[4][0] | 4 |
| non_anchor_ref_l0[4][1] | 4 |
| num_non_anchor_refs_l1[4] | 2 |
| non_anchor_ref_l1[4][0] | 4 |
| non_anchor_ref_l1[4][1] | 4 |
| num_non_anchor_refs_l0[5] | 2 |
| non_anchor_ref_l0[5][0] | 5 |
| non_anchor_ref_l0[5][1] | 4 |
| num_non_anchor_refs_l1[5] | 2 |
| non_anchor_ref_l1[5][0] | 5 |
| non_anchor_ref_l1[5][1] | 6 |
| num_non_anchor_refs_l0[6] | 2 |
| non_anchor_ref_l0[6][0] | 6 |
| non_anchor_ref_l0[6][1] | 6 |
| num_non_anchor_refs_l1[6] | 2 |
| non_anchor_ref_l1[6][0] | 6 |
| non_anchor_ref_l1[6][1] | 6 |
| num_non_anchor_refs_l0[7] | 2 |
| non_anchor_ref_l0[7][0] | 7 |
| non_anchor_ref_l0[7][1] | 6 |
| num_non_anchor_refs_l1[7] | 2 |
| non_anchor_ref_l1[7][0] | 7 |
| non_anchor_ref_l1[7][1] | 6 |

FIG. 20

| VIEWPOINT ID "view-id" (INDEX "i") | NUMBER OF DISPARITY COMPENSATION REFERENCE VIEWPOINTS "num_ref_views[i]" | DISPARITY COMPENSATION REFERENCE VIEWPOINT ID "ref_view_id[i][k]" | |
|---|---|---|---|
| | | k=0 | k=1 |
| 0 | 0 | | |
| 1 | 2 | 0 | 2 |
| 2 | 1 | 0 | |
| 3 | 2 | 2 | 4 |
| 4 | 1 | 2 | |
| 5 | 2 | 4 | 6 |
| 6 | 1 | 4 | |
| 7 | 2 | 6 | |

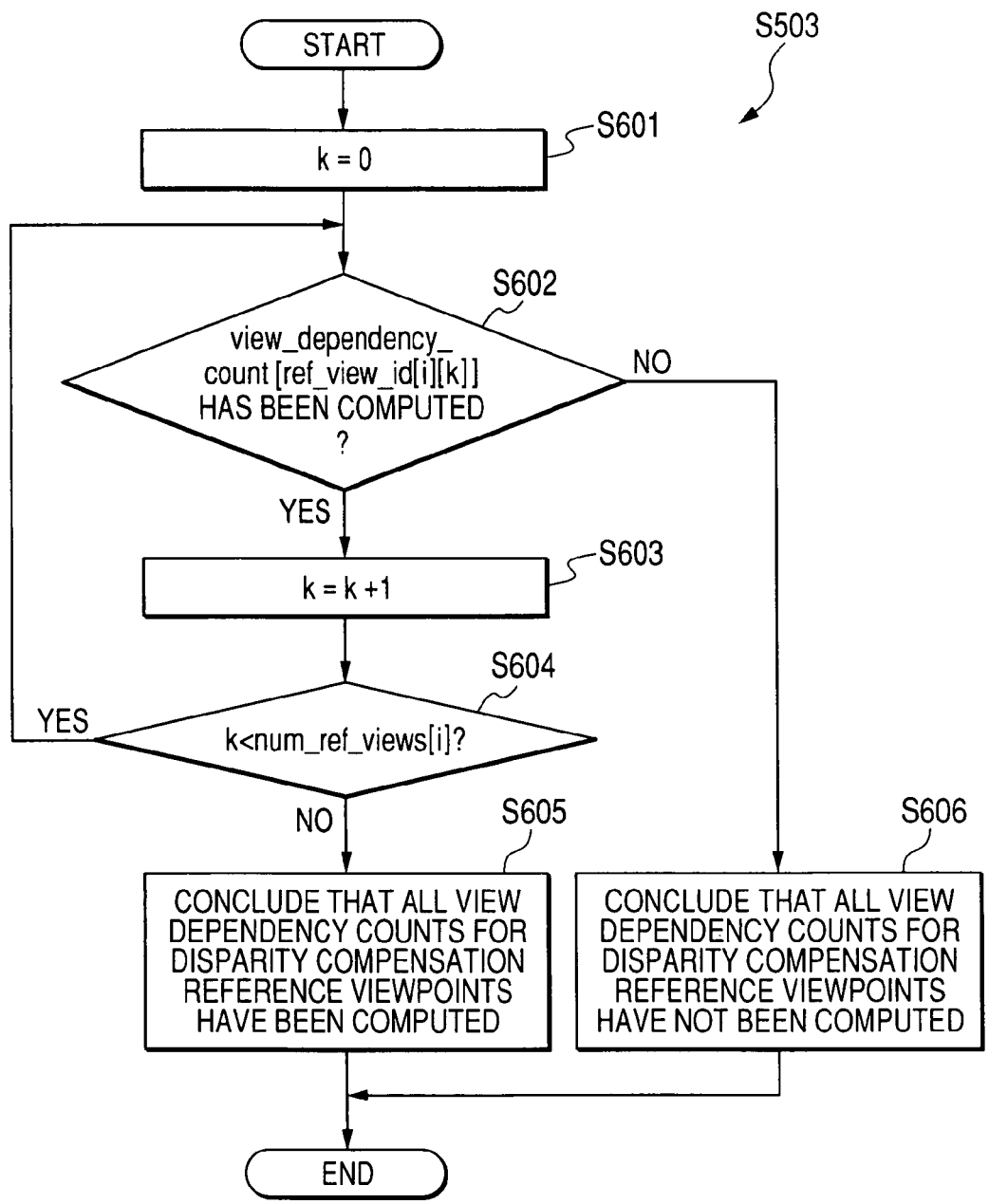

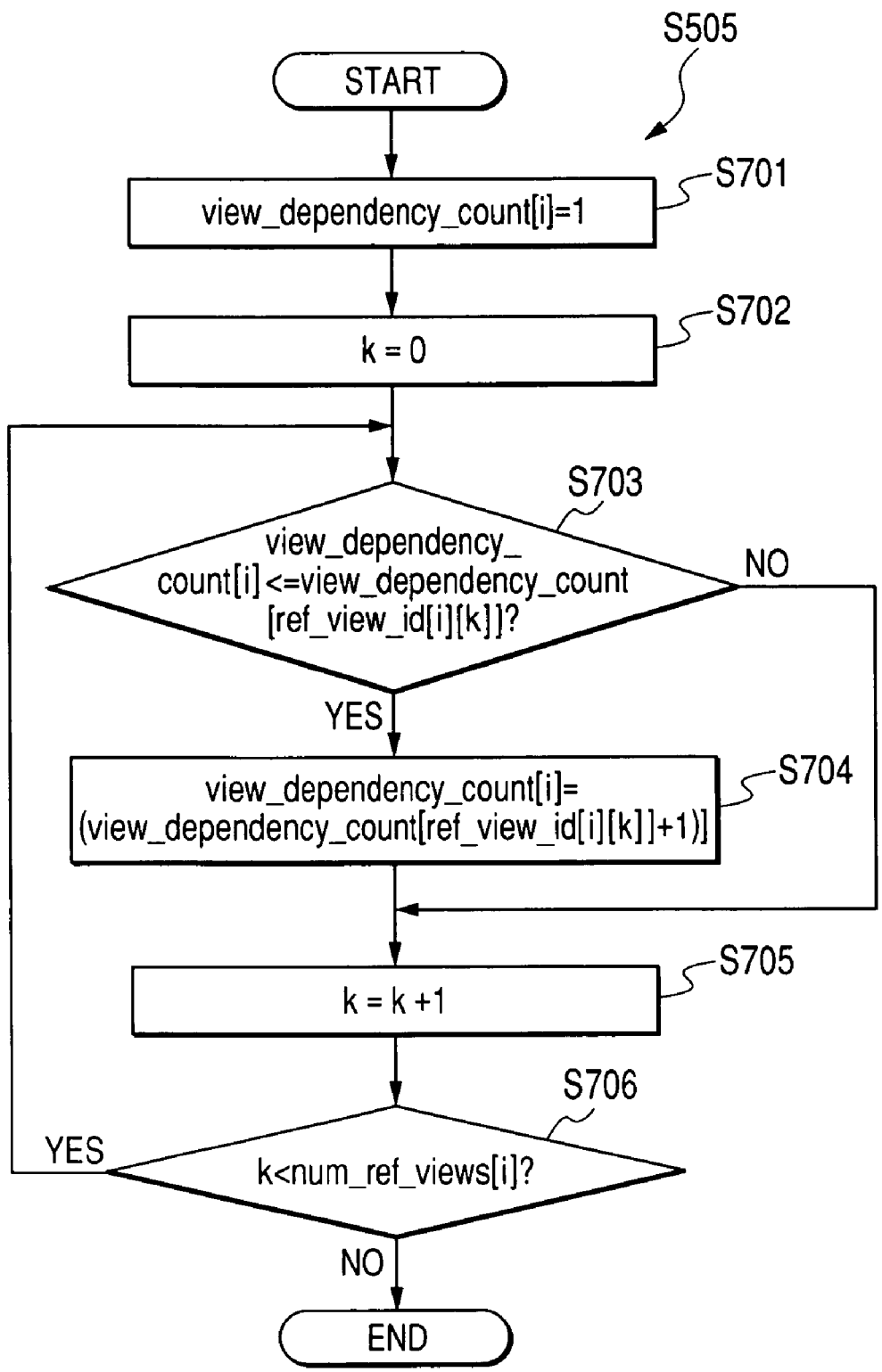

METHOD AND APPARATUS FOR ENCODING AND DECODING MULTI-VIEW VIDEO SIGNAL, AND RELATED COMPUTER PROGRAMS

BACKGROUND OF THE INVENTION

1. Field of the Invention

This invention relates to a method, an apparatus, and a computer program for encoding signals representative of multi-view video taken from multiple viewpoints. In addition, this invention relates to a method, an apparatus, and a computer program for decoding coded data representative of multi-view video taken from multiple viewpoints.

2. Description of the Related Art

An MPEG (Moving Picture Experts Group) encoder compressively encodes a digital signal (data) representing a video sequence. The MPEG encoder performs motion-compensated prediction and orthogonal transform with respect to the video signal to implement highly efficient encoding and data compression. The motion-compensated prediction utilizes a temporal redundancy in the video signal for the data compression. The orthogonal transform utilizes a spatial redundancy in the video signal for the data compression. Specifically, the orthogonal transform is discrete cosine transform (DCT).

MPEG-2 Video (ISO/IEC 13818-2) established in 1995 prescribes the coding of a video sequence. MPEG-2 Video encoders and decoders can handle interlaced scanning pictures, progressive scanning pictures, SDTV (standard definition television) pictures, and HDTV (high definition television) pictures. The MPEG-2 Video encoders and decoders are used in various applications such as the recording and playback of data on and from a DVD or a D-VHS recording medium, and digital broadcasts.

MPEG-4 Visual (ISO/IEC 14496-2) established in 1998 prescribes the highly efficient coding of a video signal in applications such as network-based data transmission and portable terminal devices.

The standard called MPEG-4 AVC/H.264 (14496-10 in ISO IEC, H.264 in ITU-T) has been established by the cooperation of ISO/IEC and ITU-T in 2003. MPEG-4 AVC/H.264 provides a higher coding efficiency than that of the MPEG-2 Video or the MPEG-4 Visual.

According to the MPEG-2 Video or the MPEG-4 Visual, the coding of a P picture of interest includes motion-compensated prediction which is implemented from only a P picture or an I picture immediately preceding the P picture of interest as viewed in the picture display order. On the other hand, in the picture coding based on the MPEG-4 AVC/H.264, a plurality of pictures can be used as reference pictures for the coding of a picture of interest, and one can be selected therefrom on a block-by-block basis and motion-compensated prediction for the coding of the picture of interest can be performed in response to the selected picture. Furthermore, in addition to pictures preceding a picture of interest as viewed in the picture display order, pictures following the picture of interest can be used as reference pictures.

According to the MPEG-2 Video or the MPEG-4 Visual, the coding of a B picture of interest refers to one reference picture preceding the B picture of interest, one reference picture following the B picture of interest as viewed in the picture display order, or both the preceding and following reference pictures on a simultaneous basis. In the latter case, the mean between the preceding and following reference pictures is used as a predicted picture, and the difference between the B picture of interest and the predicted picture is coded. On the other hand, in the picture coding based on the MPEG-4 AVC/H.264, reference pictures can arbitrarily be selected and used for prediction while being not limited to one preceding reference picture and one following reference picture. Furthermore, a B picture can be used as a reference picture.

According to the MPEG-2 Video, a coding mode is decided on a picture-by-picture basis. According to the MPEG-4 Visual, a coding mode is decided on a VOP-by-VOP basis, where VOP denotes a video object plane. In the picture coding based on the MPEG-4 AVC/H.264, slices are coding units. One picture can be composed of different-type slices such as I slices, P slices, and B slices.

The MPEG-4 AVC/H.264 defines a NAL (network abstraction layer) and a VCL (video coding layer) for encoding and decoding video pixel signals inclusive of a coding mode, motion vectors, DCT coefficients, and others.

A coded bitstream generated in conformity with the MPEG-4 AVC/H.264 is composed of NAL units. Generally, NAL units are VCL NAL units and non-VCL NAL units. Every VCL NAL unit contains data (a coding mode, motion vectors, DCT coefficients, and others) resulting from the coding by the VCL. Every non-VCL NAL unit does not contain such data. Non-VCL NAL units include an SPS (sequence parameter set), a PPS (picture parameter set), and SEI (supplemental enhancement information). The SPS contains parameter information about the coding of the whole of the original video sequence. The PPS contains parameter information about the coding of a picture. The SEI is not essential to the decoding of VCL-coded data.

In the picture coding based on the MPEG-4 AVC/H.264, every picture is divided into slices, and coding units are such slices. VCL NAL units are assigned to slices, respectively. Access units each composed of some NAL units are introduced in order to handle information represented by the coded bitstream on a picture-by-picture basis. One access unit has one coded picture.

In a binocular stereoscopic television system, two cameras take pictures of a scene for viewer's left and right eyes (left and right views) in two different directions respectively, and the pictures are indicated on a common screen to present the stereoscopic pictures to a viewer. Generally, the left-view picture and the right-view picture are handled as independent pictures respectively. Accordingly, the transmission of a signal representing the left-view picture and the transmission of a signal representing the right-view picture are separate from each other. Similarly, the recording of a signal representing the left-view picture and the recording of a signal representing the right-view picture are separate from each other. When the left-view picture and the right-view picture are handled as independent pictures respectively, the necessary total amount of coded picture information is equal to about twice that of information representing only a monoscopic picture (a single two-dimensional picture).

There has been a proposed stereoscopic television system designed so as to reduce the total amount of coded picture information. In the proposed stereoscopic television system, one of left-view and right-view pictures is labeled as a base picture while the other is set as a sub picture.

Japanese patent application publication number 61-144191/1986 discloses a transmission system for stereoscopic pictures. In the system of Japanese application 61-144191/1986, each of left-view and right-view pictures is divided into equal-size small areas called blocks. One of the left-view and right-view pictures is referred to as the first picture while the other is called the second picture. A window equal in shape and size to one block is defined in the first picture. For every block of the second picture, the difference between a signal representing a first-picture portion filling the window and a signal representing the present block of the second picture is calculated as the window is moved throughout a given range centered at the first-picture block corresponding to the present block of the second picture. Detection is made as to the position of the window at which the calculated difference is minimized. The deviation of the detected window position from the position in the first-picture block corresponding to the present block of the second picture is labeled as a position change quantity.

In the system of Japanese application 61-144191/1986, the blocks constituting one of the left-view and right-view pictures are shifted in accordance with the position change quantities. A difference signal is generated which represents the difference between the block-shift-resultant picture and the other picture. The difference signal, information representing the position change quantities, and information representing one of the left-view and right-view pictures are transmitted.

Stereoscopic video coding called Multi-view Profile (ISO/IEC 13818-2/AMD3) has been added to MPEG-2 Video (ISO/IEC 13818-2) in 1996. The MPEG-2 Video Multi-view Profile is 2-layer coding. A base layer of the Multi-view Profile is assigned to a left view, and an enhancement layer is assigned to a right view. The MPEG-2 Video Multi-view Profile implements the coding of stereoscopic video data by steps including motion-compensated prediction, discrete cosine transform, and disparity-compensated prediction. The motion-compensated prediction utilizes a temporal redundancy in the stereoscopic video data for the data compression. The discrete cosine transform utilizes a spatial redundancy in the stereoscopic video data for the data compression. The disparity-compensated prediction utilizes an inter-view redundancy in the stereoscopic video data for the data compression.

Japanese patent application publication number 6-98312/1994 discloses a system for highly efficiently coding multi-view stereoscopic pictures. The system handles a picture to be coded and two or more reference pictures. The reference pictures are selected from temporally-different pictures (different-frame pictures) of plural channels. Alternatively, the to-be-coded picture and the reference pictures may be those pictures different in parallax (disparity) and taken by cameras at slightly different positions respectively. The system includes sections for taking pattern matching between the to-be-coded picture and the reference pictures. Each of the pattern matching sections calculates the error between the to-be-coded picture and the related reference picture, and generates motion-compensation or disparity-compensation vectors.

The system in Japanese application 6-98312/1994 further includes a detector, first and second selectors, and a compensator. The detector senses the smallest among the errors calculated by the pattern matching sections, and generates a selection flag for identifying the reference picture corresponding to the sensed smallest error. The first selector chooses one from the reference pictures in accordance with the selection flag generated by the detector. The second selector responds to the selection flag and chooses, among the compensation vectors generated by the pattern matching sections, ones corresponding to the chosen reference picture. The compensator subjects the chosen reference picture to motion compensation or disparity compensation responsive to the chosen compensation vectors, thereby generating a predicted picture. In the system, a subtracter computes the residual between the to-be-coded picture and the predicted picture, and a DCT-based device encodes the computed residual, the selection flag, and the chosen compensation vectors into a bitstream of a variable-length code.

A conceivable system includes a plurality of processors for decoding a coded bitstream representative of multi-view pictures into decoded video signals on a parallel processing basis, and a three-dimensional display for indicating the decoded video signals. The decoded video signals correspond to different viewpoints, respectively. Generally, disparity-compensated prediction (parallax-compensated prediction) implemented for the decoding of a coded picture of a viewpoint refers to a reference picture which is a decoded picture of another viewpoint. In the parallel-processing-based decoding in the conceivable system, it is difficult to know, at the time of decoding a coded picture of a viewpoint, whether or not the decoding of a coded picture of another viewpoint to obtain a related reference picture has been completed. Therefore, the conceivable system can not utilize disparity-compensated prediction.

SUMMARY OF THE INVENTION

It is a first object of this invention to provide an apparatus for encoding signals representative of multi-view video in harmony with a decoding side which implements a real-time decoding procedure through parallel processing.

It is a second object of this invention to provide a method of encoding signals representative of multi-view video in harmony with a decoding side which implements a real-time decoding procedure through parallel processing.

It is a third object of this invention to provide a computer program for encoding signals representative of multi-view video in harmony with a decoding side which implements a real-time decoding procedure through parallel processing.

It is a fourth object of this invention to provide an apparatus for decoding coded data representative of multi-view video in real time through parallel processing.

It is a fifth object of this invention to provide a method of decoding coded data representative of multi-view video in real time through parallel processing.

It is a sixth object of this invention to provide a computer program for decoding coded data representative of multi-view video in real time through parallel processing.

A first aspect of this invention provides a method of encoding a multi-view video signal including picture signals corresponding to different viewpoints respectively. The method comprises the steps of designating at least one among the viewpoints as a base viewpoint, the base viewpoint corresponding to a picture signal which is encoded without referring to at least one picture signal corresponding to one of the viewpoints except the base viewpoint; determining a desired delay time of the start of decoding a coded signal originating from each of the picture signals corresponding to the viewpoints except the base viewpoint relative to the start of decoding a coded signal originating from the picture signal corresponding to the base viewpoint, and generating information representing the determined delay time; and encoding the generated information.

A second aspect of this invention provides an apparatus for decoding a coded multi-view video signal including coded signals resulting from encoding picture signals corresponding to different viewpoints respectively, wherein at least one among the viewpoints is designated as a base viewpoint, the base viewpoint corresponding to a picture signal which is encoded without referring to at least one picture signal corresponding to one of the viewpoints except the base viewpoint, and wherein the coded multi-view video signal contains coded information representing a desired delay time of the start of decoding a coded signal originating from each of the picture signals corresponding to the viewpoints except the base viewpoint relative to the start of decoding a coded signal originating from the picture signal corresponding to the base viewpoint. The apparatus comprises first means for decoding the coded information in the coded multi-view video signal to recover the desired delay times for the coded signals originating from the picture signals corresponding to the viewpoints except the base viewpoint; second means for decoding the coded signal originating from the picture signal corresponding to the base viewpoint; third means for decoding the coded signals originating from the picture signals corresponding to the viewpoints except the base viewpoint; and fourth means for delaying the decoding of the coded signals by the third means relative to the decoding of the coded signal by the second means by time intervals equal to the desired delay times recovered by the first means.

A third aspect of this invention provides a method of decoding a coded multi-view video signal including coded signals resulting from encoding picture signals corresponding to different viewpoints respectively, wherein at least one among the viewpoints is designated as a base viewpoint, the base viewpoint corresponding to a picture signal which is encoded without referring to at least one picture signal corresponding to one of the viewpoints except the base viewpoint, and wherein the coded multi-view video signal contains coded information representing a desired delay time of the start of decoding a coded signal originating from each of the picture signals corresponding to the viewpoints except the base viewpoint relative to the start of decoding a coded signal originating from the picture signal corresponding to the base viewpoint. The method comprises the steps of decoding the coded information in the coded multi-view video signal to recover the desired delay times for the coded signals originating from the picture signals corresponding to the viewpoints except the base viewpoint; decoding the coded signal originating from the picture signal corresponding to the base viewpoint; decoding the coded signals originating from the picture signals corresponding to the viewpoints except the base viewpoint; and delaying the decoding of the coded signals originating from the picture signals corresponding to the viewpoints except the base viewpoint relative to the decoding of the coded signal originating from the picture signal corresponding to the base viewpoint by time intervals equal to the recovered desired delay times.

A fourth aspect of this invention provides a computer program stored in a computer readable medium for decoding a coded multi-view video signal including coded signals resulting from encoding picture signals corresponding to different viewpoints respectively, wherein at least one among the viewpoints is designated as a base viewpoint, the base viewpoint corresponding to a picture signal which is encoded without referring to at least one picture signal corresponding to one of the viewpoints except the base viewpoint, and wherein the coded multi-view video signal contains coded information representing a desired delay time of the start of decoding a coded signal originating from each of the picture signals corresponding to the viewpoints except the base viewpoint relative to the start of decoding a coded signal originating from the picture signal corresponding to the base viewpoint. The computer program comprises the steps of decoding the coded information in the coded multi-view video signal to recover the desired delay times for the coded signals originating from the picture signals corresponding to the viewpoints except the base viewpoint; decoding the coded signal originating from the picture signal corresponding to the base viewpoint; decoding the coded signals originating from the picture signals corresponding to the viewpoints except the base viewpoint; and delaying the decoding of the coded signals originating from the picture signals corresponding to the viewpoints except the base viewpoint relative to the decoding of the coded signal originating from the picture signal corresponding to the base viewpoint by time intervals equal to the recovered desired delay times.

A fifth aspect of this invention provides a method of decoding a coded multi-view video signal including coded signals resulting from encoding picture signals corresponding to different viewpoints respectively, wherein at least one among the viewpoints is designated as a base viewpoint, the base viewpoint corresponding to a picture signal which is encoded without referring to at least one picture signal corresponding to one of the viewpoints except the base viewpoint, and wherein the coded multi-view video signal contains coded information about view dependencies representing which of the picture signals are referred to as reference signals for the encoding of each of the picture signals. The method comprises the steps of decoding the coded information in the coded multi-view video signal to recover the view dependencies; computing a desired delay time of the start of decoding a coded signal originating from each of the picture signals corresponding to the viewpoints except the base viewpoint relative to the start of decoding a coded signal originating from the picture signal corresponding to the base viewpoint in response to the recovered view dependencies; decoding the coded signal originating from the picture signal corresponding to the base viewpoint; decoding the coded signals originating from the picture signals corresponding to the viewpoints except the base viewpoint; and delaying the decoding of the coded signals originating from the picture signals corresponding to the viewpoints except the base viewpoint relative to the decoding of the coded signal originating from the picture signal corresponding to the base viewpoint by time intervals equal to the computed desired delay times.

BRIEF DESCRIPTION OF THE DRAWINGS

FIG. 4 is a table of the values of view dependency counts for the respective viewpoints which occur when pictures in the multi-view video sequence are encoded in response to the view dependencies of FIG. 2.

FIG. 5 is a diagram of an example of the first syntax structure of bitstreams applied to the case where the view dependency counts for the respective viewpoints are in a set before the set is encoded as a parameter about the whole of the video sequences.

FIG. 6 is a diagram showing an example of the coded representation of the view dependency counts for the eight viewpoints which is obtained according to the syntax structure in FIG. 5.

FIG. 17 is a diagram showing an example of the structure of a syntax applied to the encoding of view dependencies.

FIG. 18 is a diagram showing an example of syntax elements and their values which occur in the case where the view sequences are encoded with motion-compensated prediction and disparity-compensated prediction in conditions of FIG. 2 according to the syntax structure of FIG. 17.

FIG. 20 is a table showing the IDs of the viewpoints, the number of disparity-compensation reference viewpoints for each of the viewpoints, and the IDs of the disparity-compensation reference viewpoints which occur in the case where the syntax elements take values of FIG. 18.

FIG. 24 is a flowchart showing the details of a step in FIG. 23.

FIG. 25 is a flowchart showing the details of another step in FIG. 23.

DETAILED DESCRIPTION OF THE INVENTION

First Embodiment

Figure 1:
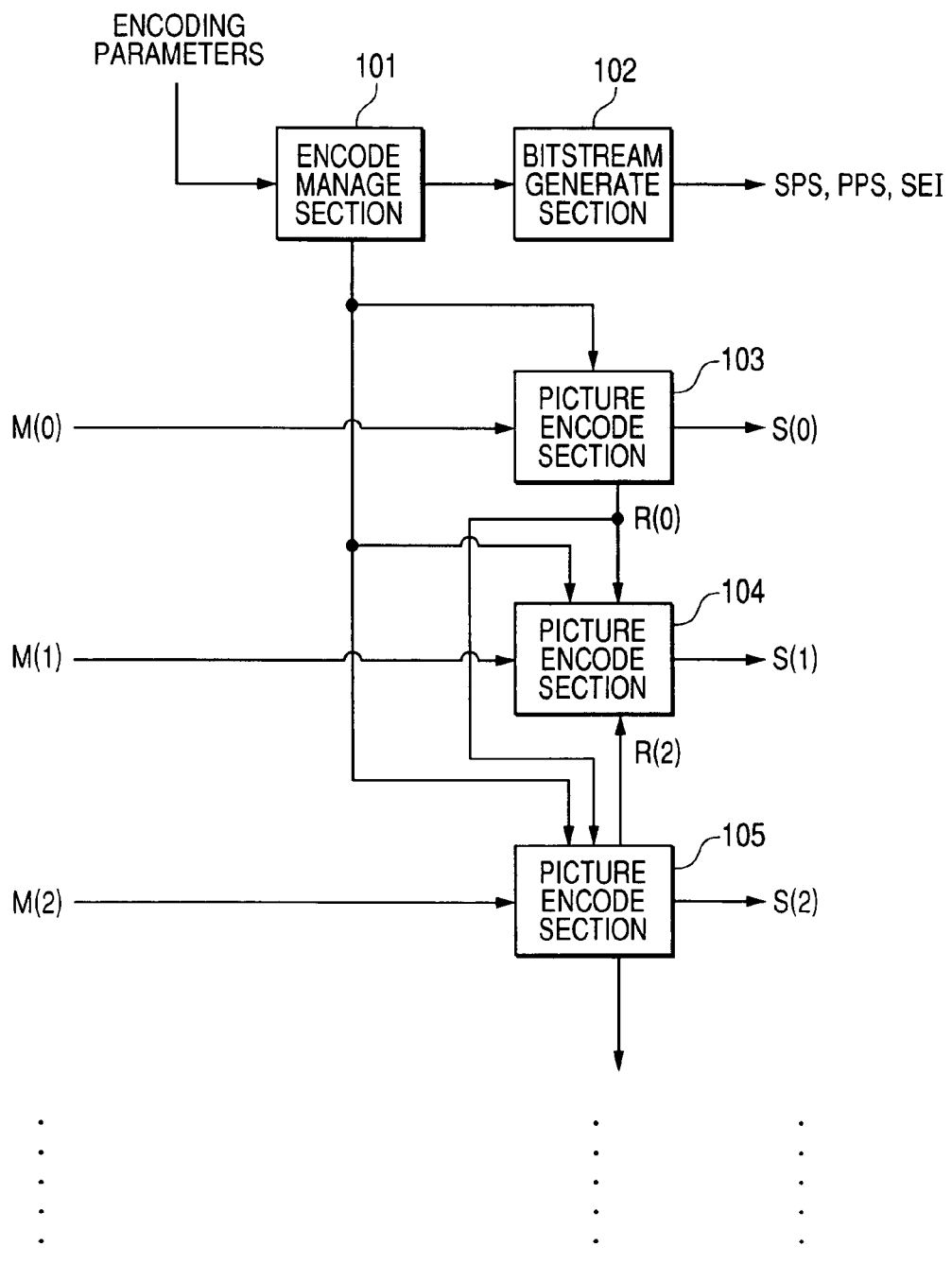
FIG. 1 is a block diagram of a multi-view video encoding apparatus according to a first embodiment of this invention.

FIG. 1 shows a multi-view video encoding apparatus according to a first embodiment of this invention. The encoding apparatus of FIG. 1 is extended from an encoding apparatus conforming to the MPEG-4 AVC/H.264 standards. Thus, the encoding apparatus of FIG. 1 has a basic portion designed to conform to the MPEG-4 AVC/H.264 standards.

As shown in FIG. 1, the encoding apparatus includes an encoding management section 101, a coded bitstream generating section 102, and picture encoding sections 103, 104, and 105. The encoding apparatus may include four or more picture encoding sections.

There are signals M(v) representing sequences of pictures taken from different viewpoints respectively, which compose a multi-view video sequence, where "v" denotes an ID for each viewpoint, and v=0, 1, 2, . . . . For example, there are data or a signal M(0) representing a sequence of pictures taken from a viewpoint having an ID of v=0, data or a signal M(1) representing a sequence of pictures taken from a viewpoint having an ID of v=1, and data or a signal M(2) representing a sequence of pictures taken from a viewpoint having an ID of v=2. For an easier understanding, the data or signal M(0) is also referred to as the video sequence M(0). The data or signal M(1) is also referred to as the video sequence M(1). The data or signal M(2) is also referred to as the video sequence M(2). The viewpoint having an ID of v=0, the viewpoint having an ID of v=1, and the viewpoint having an ID of v=2 are called the viewpoint 0, the viewpoint 1, and the viewpoint 2, respectively. The viewpoints 0, 1, and 2 differ from each other, and are sequentially arranged in that order. Pictures in each of the video sequences M(0), M(1), and M(2) are arranged in a display timing order.

For an easier understanding, data or a signal representing a picture is also referred to as a picture. Similarly, data or a signal representing a motion vector or vectors is also referred to as a motion vector or vectors. Data or a signal representing a disparity vector or vectors is also referred to as a disparity vector or vectors.

The encoding apparatus of FIG. 1 compressively encodes the video sequences M(v) into different-viewpoint coded bitstreams S(v). The encoding apparatus transmits the different-viewpoint coded bitstreams S(v) toward a decoding side. For example, the encoding apparatus compressively encodes the video sequences M(0), M(1), and M(2) into coded bitstreams S(0), S(1), and S(2) of the viewpoints 0, 1, and 2 respectively. Specifically, the picture encoding section 103 compressively encodes the video sequence M(0) into the coded bitstream S(0) of the viewpoint 0. The picture encoding section 104 compressively encodes the video sequence M(1) into the coded bitstream S(1) of the viewpoint 1. The picture encoding section 105 compressively encodes the video sequence M(2) into the coded bitstream S(2) of the viewpoint 2. The coded bitstream S(0) represents the pictures taken from the viewpoint 0, that is, the viewpoint having an ID of v=0. The coded bitstream S(1) represents the pictures taken from the viewpoint 1, that is, the viewpoint having an ID of v=1. The coded bitstream S(2) represents the pictures taken from the viewpoint 2, that is, the viewpoint having an ID of v=2.

There may be more than three video sequences about multiple viewpoints. In this case, the encoding apparatus of FIG. 1 compressively encodes more than three video sequences into bitstreams respectively. Furthermore, the encoding apparatus includes more than three picture encoding sections assigned to the respective video sequences.

The encoding management section 101 receives encoding parameters set from an external. The encoding management section 101 calculates new parameters for management purposes from the received encoding parameters. The encoding management section 101 implements management of plural types in response to the management-purpose parameters. Preferably, the management-purpose parameters include parameters about the whole of the video sequences, parameters about pictures, and parameters about slices constituting each picture.

Specifically, the encoding management section 101 performs encoding-related management on the basis of the received encoding parameters. The encoding-related management utilizes the information (the parameters) about the whole of the video sequences, the information (the parameters) about pictures, and the information (the parameters) about slices constituting each picture.

The encoding management section 101 refers the received encoding parameters, and thereby decides an order (a picture encoding order) in which pictures constituting each video sequence M(v) should be encoded. Thus, the encoding management section 101 performs the management of the picture encoding order for each video sequence M(v). For example, the encoding control section 101 decides an order (a picture encoding order) in which pictures constituting the video sequence M(O) should be encoded, an order (a picture encoding order) in which pictures constituting the video sequence M(1) should be encoded, and an order (a picture encoding order) in which pictures constituting the video sequence M(2) should be encoded.

The encoding of a picture in a video sequence may refer to at least one reference picture being the decoded picture of another picture in the same video sequence or another video sequence. The relation between the picture which is being encoded and the reference picture is called the view dependency or the reference dependency.

The encoding management section 101 performs the management of view dependencies (reference dependencies) among pictures in the video sequences M(v). The encoding management section 101 decides whether or not the encoding of every picture in each video sequence M(v) should refer to at least one decoded picture in another video sequence. For every unit corresponding to one picture or one slice, the encoding management section 101 decides whether or not disparity-compensated prediction should be performed for the encoding of every picture in each video sequence M(v). For the encoding of a picture about a viewpoint, the disparity-compensated prediction uses a decoded picture or pictures about an other viewpoint or viewpoints as a reference picture or pictures. For every unit corresponding to one picture or one slice, the encoding management section 101 decides whether or not a decoded picture resulting from the decoding of every coded picture in each video sequence M(v) should be used as a reference picture for the encoding of a picture in another video sequence. In some cases, for every unit corresponding to one picture or one slice, the encoding management section 101 selects a plurality of candidate reference pictures and decides which of the candidate reference pictures should be used as a final reference picture or pictures for the encoding of a picture of interest.

The management of the picture encoding orders for the respective video sequences M(v) by the encoding management section 101 is designed in view of the view dependencies so that the decoding side can start decoding a coded picture of interest after completing the decoding of a coded picture or pictures to obtain a reference picture or pictures for the coded picture of interest.

The encoding management section 101 performs the management of view dependency counts provided for the respective viewpoints. The view dependency counts are parameters set from an external. The encoding management section 101 may calculate the view dependency counts from the view dependencies and the picture encoding orders.

The encoding management section 101 feeds the coded bitstream generating section 102 with the information about the aforesaid management and the results of the aforesaid decisions. The encoding management section 101 controls the picture encoding sections 103, 104, and 105 in response to the information about the aforesaid management and the results of the aforesaid decisions.

Figure 2:
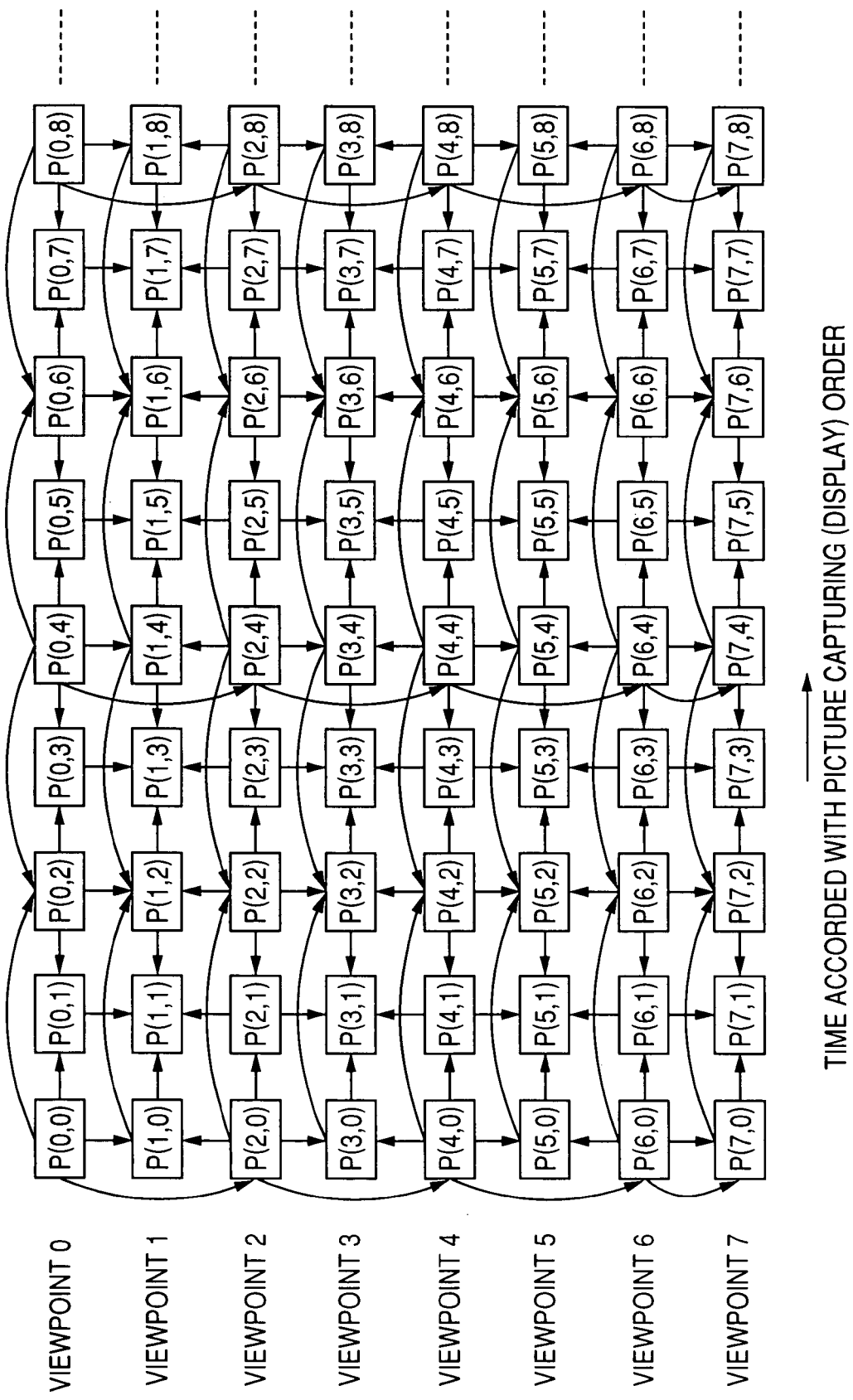
FIG. 2 is a diagram of an example of view dependencies (reference dependencies) among pictures in a multi-view video sequence corresponding to eight viewpoints.

FIG. 2 shows an example of view dependencies (reference dependencies) among pictures in a multi-view video sequence corresponding to eight viewpoints (viewpoints 0, 1, 2, . . . , 7). The reference dependencies occur during the encoding of the video sequences. In FIG. 2, P(v, t) denotes a picture taken from a viewpoint having an ID equal to "v" at a time point "t", where v=0, 1, 2, and t=0, 1, 2, . . . . Thus, P(v, t) denotes a picture in a video sequence M(v) which occurs at a time point "t". The encoding of the video sequences includes motion-compensated prediction and disparity-compensated prediction. In FIG. 2, conditions of the motion-compensated prediction and the disparity-compensated prediction are denoted by arrows. Specifically, a picture at which the starting point of an arrow exists is used as a reference picture by the motion-compensated prediction or the disparity-compensated prediction in the encoding of a picture denoted by the ending point of the arrow. The arrows are horizontally-extending ones which relate to the motion-compensated prediction, and vertically-extending ones which relate to the disparity-compensated prediction.

With reference to FIG. 2, the encoding of the pictures P(0, t) taken from the viewpoint 0 does not utilize the disparity-compensated prediction and hence refers to none of decoded pictures about the other viewpoints. The encoding of the pictures P(0, t) utilizes the motion-compensated prediction which refers to decoded pictures about the viewpoint 0. The encoding of the pictures P(0, t) is in conformity to the MPEG-4 AVC/H.264 standards. A viewpoint corresponding to pictures encoded without referring to decoded pictures in the other viewpoints for the disparity-compensated prediction is defined as a base viewpoint. At least one of the viewpoints is preset as a base viewpoint. In FIG. 2, the viewpoint 0 is a base viewpoint while the viewpoints 1-7 are not base ones (that is, non-base viewpoints). Thus, the encoding of pictures taken from each of the viewpoints 1-7 (the non-base viewpoints) utilizes the disparity-compensated prediction which refers to decoded pictures about another viewpoint or other viewpoints. For example, the encoding of the picture P(2, 0) taken from the viewpoint 2 utilizes the disparity-compensated prediction which refers to the decoded picture of the picture P(0, 0) about the viewpoint 0. The encoding of the picture P(1, 0) taken from the viewpoint 1 utilizes the disparity-compensated prediction which refers to the decoded picture of the picture P(0, 0) about the viewpoint 0 and also the decoded picture of the picture P(2, 0) about the viewpoint 2.

The decoding of the coded pictures P(v, t) is inverse with respect to the above-mentioned encoding of the original pictures P(v, t), and utilizes the motion-compensated prediction and the disparity-compensated prediction similar to those in the encoding of the original pictures P(v, t).

Figure 3:
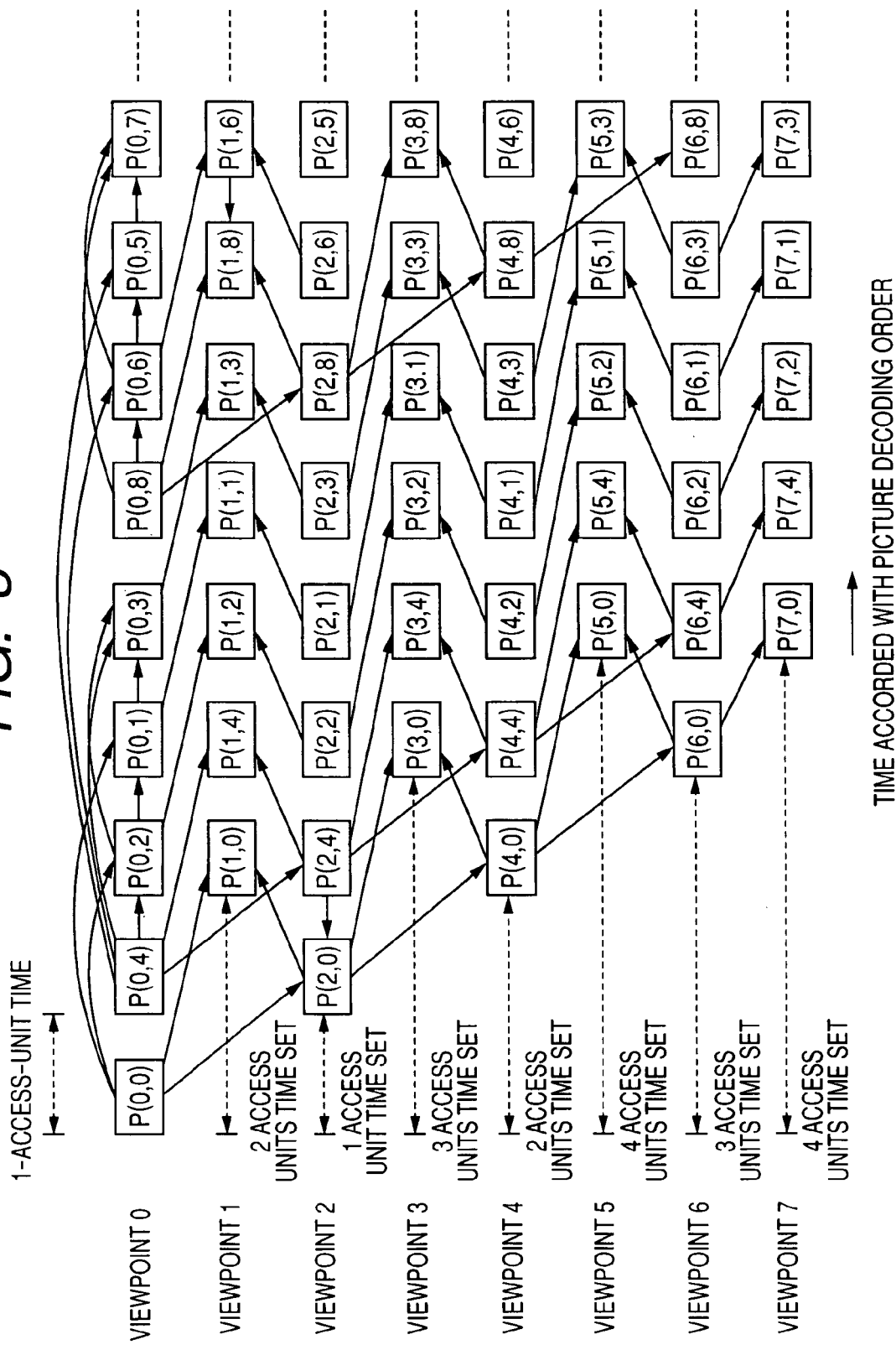
FIG. 3 is a diagram of an example of a picture decoding order in which coded pictures having the view dependencies in FIG. 2 are decoded in real time through parallel processing.

FIG. 3 shows an example of the picture decoding order in which the decoding side decodes coded pictures (picture-corresponding segments of coded bitstreams) in real time through parallel processing. The coded bitstreams relate to the respective viewpoints, and are generated by the encoding procedure utilizing the reference dependencies in FIG. 2. In FIG. 3, P(v, t) denotes a picture taken from a viewpoint having an ID equal to "v" at a time point "t", where v=0, 1, 2, and t=0, 1, 2, . . . .

With reference to FIG. 3, the disparity compensation is not implemented between vertically-aligned pictures. Thus, the dependency does not exist between vertically-aligned pictures. Accordingly, segments of the coded bitstreams which correspond to vertically-aligned pictures in FIG. 3 are allowed to be decoded at the same timings.

In FIG. 3, a picture at which the starting point of an arrow exists is used as a reference picture by the motion-compensated prediction or the disparity-compensated prediction in the decoding of a picture denoted by the ending point of the arrow. The arrows for the motion-compensated prediction in the decoding of pictures about the viewpoint 0 are illustrated in FIG. 3 while the arrows for the motion-compensated prediction in the decoding of pictures about the viewpoints 1-7 are omitted from FIG. 3 for a clarity purpose. A time for which one access unit of each of the coded bitstreams is decoded is defined as one access unit time interval.

Since the viewpoint 0 is a base viewpoint, the decoding of the coded bitstream about the viewpoint 0 can be independent of the decoding of the coded bitstreams about the other viewpoints 1-7. The coded bitstreams about the viewpoints 1-7 result from the encoding procedure utilizing the disparity-compensated prediction. Accordingly, the decoding of each of the coded bitstreams about the viewpoints 1-7 depends on the decoding of an other-viewpoint coded bitstream or bitstreams.

For example, in FIG. 3, the decoding of the picture P(2, 0) about the viewpoint 2 utilizes the disparity-compensated prediction which refers to the decoded picture of the picture P(0, 0) about the viewpoint 0. Therefore, the decoding of the picture P(2, 0) and the decoding of the picture P(0, 0) should not be at the same timing. The timing of the decoding of the picture P(2, 0) is delayed until the decoding of the picture P(0, 0) is completed. Similarly, the decoding of the picture P(2, 4) about the viewpoint 2 utilizes the disparity-compensated prediction which refers to the decoded picture of the picture P(0, 4) about the viewpoint 0. Therefore, the decoding of the picture P(2, 4) and the decoding of the picture P(0, 4) should not be at the same timing. The timing of the decoding of the picture P(2, 4) is delayed until the decoding of the picture P(0, 4) is completed. Similarly, the decoding of the picture P(2, 8) about the viewpoint 2 utilizes the disparity-compensated prediction which refers to the decoded picture of the picture P(0, 8) about the viewpoint 0. Therefore, the decoding of the picture P(2, 8) and the decoding of the picture P(0, 8) should not be at the same timing. The timing of the decoding of the picture P(2, 8) is delayed until the decoding of the picture P(0, 8) is completed.

Accordingly, the timing of the picture decoding of the coded bitstream about the viewpoint 2 is delayed from that of the decoding of the coded bitstream about the viewpoint 0 by one access unit time interval. The timing delay of the picture decoding of the coded bitstream about each of the non-base viewpoints from that of the coded bitstream about the base viewpoint in access unit time intervals is defined as a view dependency count. Thus, regarding the decoding of a first coded picture about a view point which utilizes the disparity-compensated prediction referring to the decoded picture of a second coded picture (a reference picture) about another viewpoint, each view dependency count is a parameter letting the decoding side know a proper start timing of the decoding of the first coded picture at which the decoding of the second coded picture has been completed. The view dependency count for the viewpoint 0, that is, the base viewpoint, is set to "0". The view dependency count for the viewpoint 2 is set to "1" since the timing of the picture decoding of the coded bitstream about the viewpoint 2 is delayed from that of the decoding of the coded bitstream about the viewpoint 0 by one access unit time interval.

FIG. 4 shows the relation between the viewpoints 0-7 and the view dependency counts assigned thereto in the case where the reference dependencies utilized in the encoding procedure are those in FIG. 2. As shown in FIG. 4, the view dependency count for the viewpoint 0 is set to "0". The view dependency count for the viewpoint 1 is set to "2". The view dependency count for the viewpoint 2 is set to "1". The view dependency count for the viewpoint 3 is set to "3". The view dependency count for the viewpoint 4 is set to "2". The view dependency count for the viewpoint 5 is set to "4". The view dependency count for the viewpoint 6 is set to "3". The view dependency count for the viewpoint 7 is set to "4".

The value of each of the view dependency counts for the viewpoint 1-7 represents a desired delay of the decoding of coded pictures about the related one of the viewpoints 1-7 relative to the decoding of coded pictures about the viewpoint 0 (the base viewpoint). The desired delay is expressed in access unit number. Thus, a desired delay of the decoding of coded pictures about each of the viewpoints 1-7 relative to the decoding of coded pictures about the viewpoint 0 (the base viewpoint) is determined in access unit number according to the view dependencies and the picture encoding orders. Each of the view dependency counts for the viewpoints 1-7 is set to represent the corresponding desired delay of the picture decoding. On the other hand, the view dependency count for the viewpoint 0 is set to "0".

The view dependency counts for the respective viewpoints are encoded before being transmitted to the decoding side. The coded bitstreams about the respective viewpoints are transmitted to the decoding side. The decoding side decodes the coded view dependency counts. The decoding side decodes the coded bitstreams in real time through parallel processing. During that time, the decoding side knows, from the decoded view dependency counts, a proper timing delay (a desired delay) of the picture decoding of the coded bitstream about each of the non-base viewpoints relative to that of the coded bitstream about the base viewpoint. The decoding side delays the start timings of the picture decoding of the coded bitstreams about the non-base viewpoints in accordance with the desired delays represented by the related view dependency counts respectively. Thereby, the synchronization among the coded bitstreams about the base and non-base viewpoints is acquired. Thus, regarding the decoding of a first coded picture about a view point which utilizes the disparity-compensated prediction referring to the decoded picture of a second coded picture (a reference picture) about another viewpoint, the decoding side starts the decoding of the first coded picture after the decoding of the second coded picture has been completed.

There are first and second ways of encoding the view dependency counts. In the first way, the view dependency counts for the respective viewpoints are in a set before the set is encoded as a parameter about the whole of the video sequences. An example of such a parameter is an SPS (sequence parameter set) or SEI (supplemental enhancement information) prescribed by the MPEG-4 AVC/H.264 standards. In the second way, the view dependency counts for the respective viewpoints are individually and separately encoded on a viewpoint-by-viewpoint basis.

FIG. 5 shows a syntax structure taken in the first way of encoding the view dependency counts. In FIG. 5, "num_views_minus1" is a parameter for encoding the number of viewpoints from which multi-view video to be encoded is taken. The number of viewpoints is 1 or greater. Accordingly, the value equal to the number of viewpoints minus 1 is encoded into 8 bits (fixed-length data). The number of viewpoints in the range of 1 to 256 can be expressed by 8 bits.

In FIG. 5, "view_dependency[i]" is a set of parameters for encoding view dependency counts. Each of the view dependency counts is encoded into 8 bits (fixed-length data). The view dependency count in the range of 0 to 255 can be expressed by 8 bits. Here, "i" in "view_dependency[i]" is a viewpoint ID. By a combination with "for loop", the view dependency counts for the respective viewpoints are encoded.

FIG. 6 shows an example of the coded representation of the view dependency counts for the 8 viewpoints (see FIGS. 2-4) which is obtained according to the syntax structure in FIG. 5. As shown in FIG. 6, an eight-bit string by a binary notation for "num_views_minus 1" is "00000111" meaning that there are 8 viewpoints. The eight-bit string for "num_views_minus1" is followed by 8 eight-bit string sets for "view_dependency [0]" to "view_dependency[7]" respectively. The 8 eight-bit string sets represent the view dependency counts for the 8 viewpoints, respectively.

In FIG. 6, the view dependency count for the viewpoint 0 is "0" so that its coded representation for "view_dependency [0]" is "00000000". The view dependency count for the viewpoint 1 is "2" so that its coded representation for "view_dependency[1]" is "00000010". The view dependency count for the viewpoint 2 is "1" so that its coded representation for "view_dependency[2]" is "00000001". The view dependency count for the viewpoint 3 is "3" so that its coded representation for "view_dependency[3]" is "00000011". The view dependency count for the viewpoint 4 is "2" so that its coded representation for "view_dependency[4]" is "00000010". The view dependency count for the viewpoint 5 is "4" so that its coded representation for "view_dependency [5]" is "00000100". The view dependency count for the viewpoint 6 is "3" so that its coded representation for "view_dependency[6]" is "00000011". The view dependency count for the viewpoint 7 is "4" so that its coded representation for "view_dependency[7]" is "00000100".

It should be noted that in the first encoding way, the view dependency counts may be encoded into data of a Huffman code, an entropy code, or an arithmetic code.

Figures 7, 8:
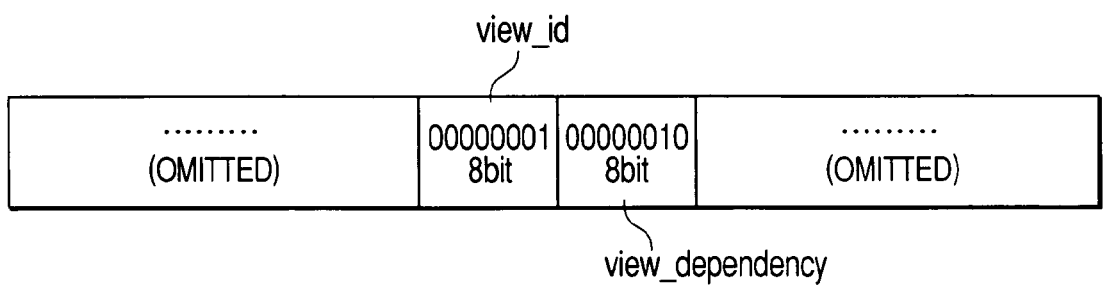
FIG. 7 is a diagram of an example of the second syntax structure of bitstreams applied to the case where the view dependency counts for the respective viewpoints are individually and separately encoded on a viewpoint-by-viewpoint basis.
FIG. 8 is a diagram showing an example of the coded representation of the view dependency count for the viewpoint 1 which is obtained according to the syntax structure in FIG. 7.

FIG. 7 shows a syntax structure taken in the second way of encoding the view dependency counts which utilizes VCL NAL units prescribed by the MPEG-4 AVC/H.264 standards. In FIG. 7, "view_id" is a parameter for encoding a viewpoint ID. As shown in FIG. 7, the viewpoint ID is encoded into 8 bits (fixed-length data). When the number of viewpoints is 256 or less, the viewpoint ID in the range of 0 to 255 can be expressed by 8 bits.

In FIG. 7, "view_dependency" is a parameter for encoding a view dependency count. The view dependency count is encoded into 8 bits (fixed-length data). The view dependency count in the range of 0 to 255 can be expressed by 8 bits.

FIG. 8 shows an example of the coded representation of a view dependency count for one of the 8 viewpoints (see FIGS. 2-4) which is obtained according to the syntax structure in FIG. 7. As shown in FIG. 8, an eight-bit string by a binary notation for "view_id" is "00000001" meaning the viewpoint ID for the viewpoint 1. The eight-bit string for "view_id" is followed by an eight-bit string for "view_dependency". In FIG. 8, the eight-bit string for "view_dependency" is "00000010" meaning that the view dependency count for the viewpoint 1 is "2". The eight-bit string for "view_id" and the eight-bit string for "view_dependency" are coded in a VCL NAL unit prescribed by the MPEG-4 AVC/H.264 standards. Similarly, the view dependency counts for the viewpoints other than the viewpoint 1 are individually and separately encoded on a viewpoint-by-viewpoint basis utilizing VCL NAL units.

It should be noted that in the second encoding way, the view dependency counts may be encoded into data of a Huffman code, an entropy code, or an arithmetic code.

Preferably, the view dependency counts are encoded for every slice. The view dependency counts may not be encoded for every slice. Regarding each of the viewpoints, the encoding apparatus is required to let the decoding side know the value of the related view dependency count at a moment corresponding to the first access unit in the related video sequence. Preferably, in the decoding side, the default values of the view dependency counts are "0", and a coded view dependency count or counts are decoded before the corresponding view dependency count or counts are updated from the default value or values to the decoded value or values.

In order to provide the compatibility with an MPEG-4 AVC/H.264 system, the video sequence about the base viewpoint may be encoded through the use of the syntax structure conforming to the MPEG-4 AVC/H.264 standards rather than the syntax structure in FIG. 7. In this case, the coded bitstream about the base viewpoint can be decoded by the MPEG-4 AVC/H.264 system. Since the syntax structure conforming to the MPEG-4 AVC/H.264 standards is used instead of the syntax structure in FIG. 7, the view dependency count for the base viewpoint can not be encoded through the use of "view_dependency". Thus, the view dependency count for the base viewpoint can not be transmitted to the decoding side. Accordingly, the viewpoint concerning the coded bitstream resulting from the MPEG-4 AVC/H.264 encoding procedure is designated as a base viewpoint, and the decoding side uses the default value of the view dependency count for the base viewpoint which is equal to "0".

The view dependency counts may be individually and separately encoded on a viewpoint-by-viewpoint basis together with encoding parameters for the respective viewpoints rather than VCL NAL units prescribed by the MPEG-4 AVC/H.264 standards.

With reference back to FIG. 1, the encoding management section 101 feeds the coded bitstream generating section 102 with the parameters about the whole of the video sequences, the parameters about pictures, and the parameters about supplemental enhancement information. The coded bitstream generating section 102 encodes the parameters about the whole of the video sequences, the parameters about pictures, and the parameters about supplemental enhancement information into a coded bitstream representative of an SPS (sequence parameter set), a PPS (picture parameter set), and SEI (supplemental enhancement information) prescribed by the MPEG-4 AVC/H.264 standards. The parameters about the whole of the video sequences are assigned to the SPS. The parameters about pictures are assigned to the PPS. The parameters about supplemental enhancement information are assigned to the SEI.

The decoding side decides whether or not each of the viewpoints concerning the respective incoming coded bitstreams is a base viewpoint. The encoding apparatus generates parameters each enabling the decoding side to decide whether or not each of the viewpoints concerning the respective incoming coded bitstreams is a base viewpoint. The generation of the parameters is implemented by the encoding management section 101. The encoding apparatus directly or indirectly encodes the generated parameters before sending the coded version thereof to the decoding side. The directly or indirectly encoding is implemented by the coded bitstream generating section 102. Thus, the coded representation of the parameters is contained in the coded bitstream generated by the coded bitstream generating section 102. The indirectly encoding is designed so that the decoding side can recover the original parameters through calculation from other parameters.

The view dependency counts for the respective viewpoints may be in a set before the set is encoded by the coded bitstream generating section 102 as a parameter about the whole of the video sequences. In this case, the view dependency counts for the respective viewpoints are encoded as one of the parameters in the SPS or SEI prescribed by the MPEG-4 AVC/H.264 standards through the use of the syntax structure in FIG. 5.

The picture encoding section 103 encodes the video sequence M(0) taken from the viewpoint 0 into the coded bitstream S(0) on an access-unit by access-unit basis while being controlled by the encoding management section 101. Pictures in the video sequence M(0) are in the display timing order. The coded bitstream S(0) relates to the viewpoint 0. Similarly, the picture encoding section 104 encodes the video sequence M(1) taken from the viewpoint 1 into the coded bitstream S(1) on an access-unit by access-unit basis while being controlled by the encoding management section 101. Pictures in the video sequence M(1) are in the display timing order. The coded bitstream S(1) relates to the viewpoint 1. Furthermore, the picture encoding section 105 encodes the video sequence M(2) taken from the viewpoint 2 into the coded bitstream S(2) on an access-unit by access-unit basis while being controlled by the encoding management section 101. Pictures in the video sequence M(2) are in the display timing order. The coded bitstream S(2) relates to the viewpoint 2.

The picture encoding section 103 feeds a reference picture R(0) to the picture encoding sections 104 and 105. The reference picture R(0) relates to the viewpoint 0. The picture encoding section 105 feeds a reference picture R(2) to the picture encoding section 104. The reference picture R(2) relates to the viewpoint 2. The picture encoding section 105 uses the reference picture R(0) in the encoding of the video sequence M(2). The picture encoding section 104 uses the reference pictures R(0) and R(2) in the encoding of the video sequence M(1).

Preferably, the picture encoding sections 103, 104, and 105 are of the same structure. Accordingly, a picture encoding section used as each of the picture encoding sections 103, 104, and 105 will be described in detail hereafter.

Figure 9:
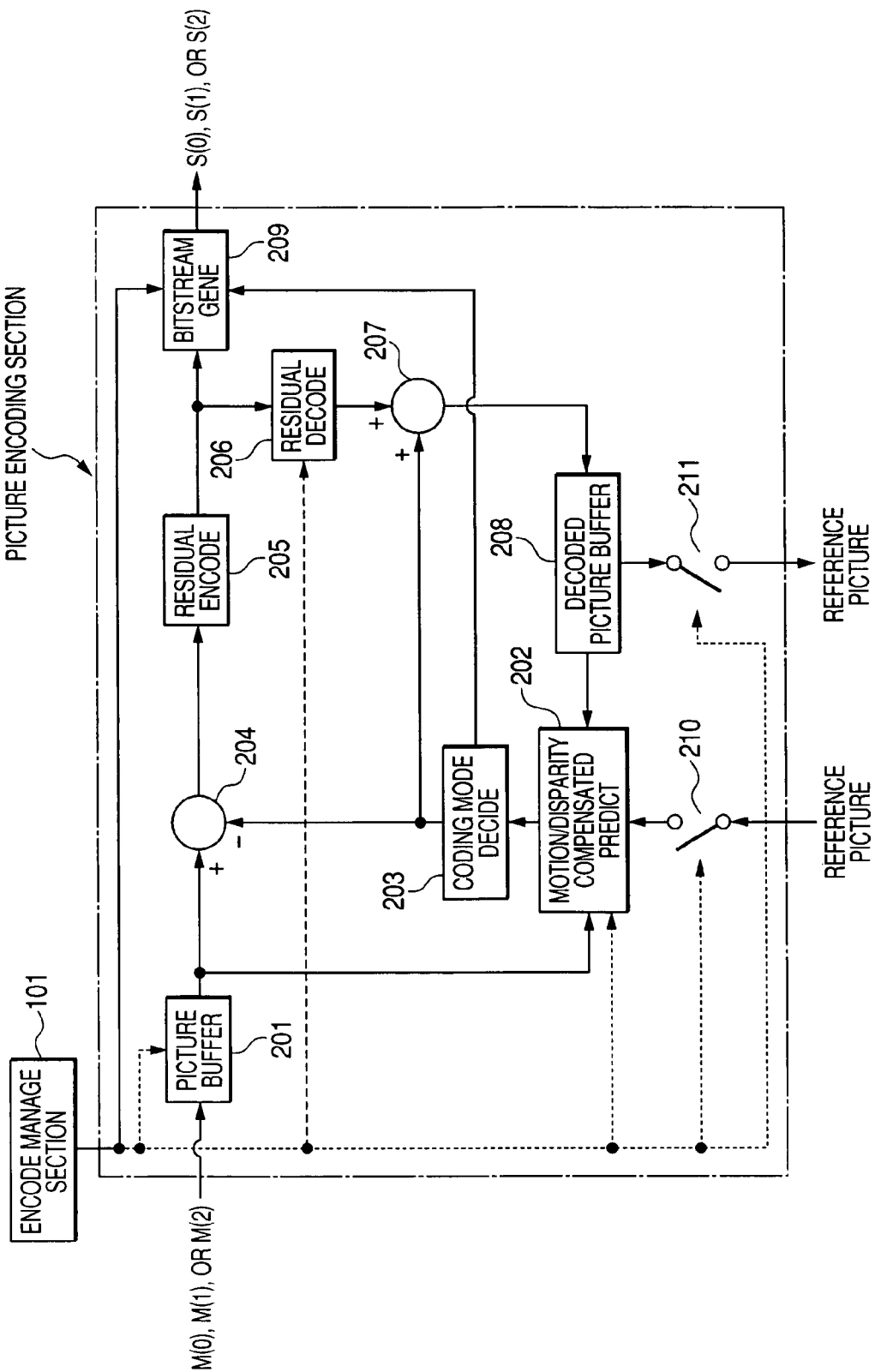
FIG. 9 is a block diagram of a picture encoding section in the encoding apparatus of FIG. 1.

As shown in FIG. 9, a picture encoding section (the picture encoding section 103, 104, or 105) includes a picture buffer 201, a motion/disparity-compensated predicting section 202, a coding-mode deciding section 203, a subtracter 204, a residual-signal encoding section 205, a residual-signal decoding section 206, an adder 207, a decoded picture buffer 208, a bitstream generating section 209, and switches 210 and 211. The devices and sections 201-211 are controlled by the encoding management section 101.

The motion/disparity-compensated predicting section 202 can be connected via the switch 210 to a decoded picture buffer or buffers in an other picture encoding section or sections. The decoded picture buffer 208 can be connected via the switch 211 to a motion/disparity-compensated predicting section or sections in an other picture encoding section or sections.

In the case where the encoding management section 101 sets the switch 210 in its OFF state while setting the switch 211 in its ON state, the picture encoding section of FIG. 9 operates as the picture encoding section 103 about the viewpoint 0. In the case where the encoding management section 101 sets the switch 210 in its ON state while setting the switch 211 in its OFF state, the picture encoding section of FIG. 9 operates as the picture encoding section 104 about the viewpoint 1. In the case where the encoding management section 101 sets the switches 210 and 211 in their ON states, the picture encoding section of FIG. 9 operates as the picture encoding section 105 about the viewpoint 2.

With reference to FIG. 9, pictures in the video sequence M(0), M(1), or M(2) are sequentially inputted into the picture buffer 201 in the display timing order. The picture buffer 201 stores the inputted pictures. The picture buffer 201 sequentially outputs the stored pictures in the picture encoding order decided by the encoding management section 101. Thus, the picture buffer 201 rearranges the pictures from the display timing order to the encoding order. The picture buffer 201 divides every picture to be outputted into equal-size blocks each composed of, for example, 16 by 16 pixels. Blocks are also referred to as multi-pixel blocks. The picture buffer 201 sequentially outputs blocks (multi-pixel blocks) constituting every picture.

The control of the picture encoding section of FIG. 9 by the encoding management section 101 is designed so that one picture will be managed in one access unit, that one access unit will be divided into slices constituting the original picture, and that the slices will be managed and encoded. The encoding management section 101 generates information about slices constituting every picture, and feeds the generated slice-related information to the bitstream generating section 209. For every slice, the bitstream generating section 209 encodes the slice-related information into a portion (a VCL NAL unit prescribed by the MPEG-4 AVC/H.264 standards) of a coded bitstream S(0), S(1), or S(2).

The encoding management section 101 has the viewpoint ID for the video sequence M(0), M(1), or M(2) inputted into the picture encoding section of FIG. 9. The encoding management section 101 adds the viewpoint ID to the slice-related information fed to the bitstream generating section 209. Thus, the viewpoint ID is encoded into a portion of the coded bitstream S(0), S(1), or S(2).

The encoding management section 101 has the view dependency count for the viewpoint about the video sequence M(0), M(1), or M(2) inputted into the picture encoding section of FIG. 9. As previously mentioned, the view dependency counts may be individually and separately encoded on a viewpoint-by-viewpoint basis. In this case, the encoding management section 101 adds the view dependency count to the slice-related information fed to the bitstream generating section 209. Thus, the view dependency count is encoded into a portion of the coded bitstream S(0), S(1), or S(2). Specifically, according to the syntax structure in FIG. 7, the view dependency count is encoded as one of parameters about each of slices constituting one picture. As previously mentioned, the view dependency count may not be encoded for every slice. Preferably, the view dependency count which differs from "0" is encoded for at least an access unit corresponding to a decoding start.

The operation of the picture encoding section of FIG. 9 can be changed among different modes including first, second, and third modes and other modes having combinations of at least two of the first to third modes. During the first mode of operation, a block outputted from the picture buffer 201 is subjected to intra coding, and thereby the picture is compressively encoded into a part of the coded bitstream S(0), S(1), or S(2) without using a reference picture or pictures. The used intra coding is known one prescribed by, for example, the MPEG-4 AVC/H.264 standards. The intra coding prescribed by the MPEG-4 AVC/H.264 standards is implemented by an intra coding section (not shown). During the second mode of operation, a block outputted from the picture buffer 201 is compressively encoded through motion-compensated prediction using a reference picture or pictures resulting from the decoding of a coded picture or pictures, and motion vectors calculated in the motion-compensated prediction are also encoded. During the third mode of operation, a block outputted from the picture buffer 201 is compressively encoded through disparity-compensated prediction using a reference picture or pictures originating from an other-viewpoint video sequence or sequences, and disparity vectors calculated in the disparity-compensated prediction are also encoded. Under the control by the encoding management section 101, the operation of the picture encoding section of FIG. 9 is adaptively changed among the different modes. As previously indicated, the different modes include the first, second, and third modes, and the other modes having combinations of at least two of the first to third modes.

The motion/disparity-compensated predicting section 202 implements motion-compensated prediction accorded with, for example, the MPEG-4 AVC/H.264 standards. The motion/disparity-compensated predicting section 202 further implements disparity-compensated prediction in the case where the viewpoint about the video sequence M(0), M(1), or M(2) inputted into the picture encoding section of FIG. 9 differs from the base viewpoint. The motion/disparity-compensated predicting section 202 does not implement disparity-compensated prediction in the case where the viewpoint about the video sequence M(0), M(1), or M(2) inputted into the picture encoding section of FIG. 9 is the base viewpoint.

The motion/disparity-compensated predicting section 202 sequentially receives blocks (blocks to be encoded) of every picture from the picture buffer 201. Basically, the motion/disparity-compensated predicting section 202 implements block matching between a current block to be encoded and blocks of a reference picture or pictures fed from the decoded picture buffer 208 and an other picture encoding section or sections while being controlled by the encoding management section 101. During the block matching, the motion-compensated predicting section 202 detects a motion vector or vectors and a disparity-vector or vectors, and generates a motion/disparity-compensated prediction block (a motion/disparity-compensated prediction signal). The motion/disparity-compensated predicting section 202 feeds the motion vector or vectors, the disparity vector vectors, and the motion/disparity-compensated prediction signal to the coding-mode deciding section 203.

The encoding management section 101 decides different modes of motion/disparity-compensated prediction. Each of the motion/disparity-compensated prediction modes is defined by a set of items including an item indicative of whether or not motion-compensated prediction should be performed, an item indicative of whether or not disparity-compensated prediction should be performed, an item indicative of the number of a reference picture or pictures for motion-compensated prediction, an item indicative of the number of a reference picture or pictures for disparity-compensated prediction, an item indicative of which of decoded pictures should be used as a reference picture or pictures (that is, which of candidate reference pictures should be used as a final reference picture or pictures) for motion-compensated prediction, an item indicative of which of decoded pictures should be used as a reference picture or pictures (that is, which of candidate reference pictures should be used as a final reference picture or pictures) for disparity-compensated prediction, and an item indicative of a block size. Each of the items is indicative of a parameter changeable among different states. Thus, each of the items is changeable among different states corresponding to the different states of the related parameter respectively. The motion/disparity-compensated prediction modes are assigned to different combinations of the states of the items, respectively. Accordingly, the number of the motion/disparity-compensated prediction modes is equal to the number of the different combinations of the states of the items. For example, the block size for motion/disparity-compensated prediction can be adaptively changed among predetermined different values (candidate block sizes). Preferably, the greatest of the different values is equal to the size of blocks fed from the picture buffer 201. In the case where the current block is composed of 16 by 16 pixels, the different candidate block sizes are, for example, a value of 16 by 16 pixels, a value of 16 by 8 pixels, a value of 8 by 16 pixels, a value of 8 by 8 pixels, a value of 8 by 4 pixels, a value of 4 by 8 pixels, and a value of 4 by 4 pixels.

According to each of the motion/disparity-compensated prediction modes, the encoding management section 101 controls the motion/disparity-compensated predicting section 202 to implement corresponding motion/disparity-compensated prediction, and to detect a motion vector or vectors and a disparity vector or vectors and generate a motion/disparity-compensated prediction signal. The motion-compensated predicting section 202 feeds the motion vector or vectors, the disparity vector or vectors, and the motion/disparity-compensated prediction signal to the coding-mode deciding section 203. The motion/disparity-compensated predicting section 202 obtains results (motion vectors, disparity vectors, and motion/disparity-compensated prediction signals) of motion/disparity-compensated predictions for the respective motion/disparity-compensated prediction modes. Accordingly, the motion/disparity-compensated predicting section 202 feeds the respective-modes motion vectors, the respective-modes disparity vectors, and the respective-modes motion/disparity-compensated prediction signals to the coding-mode deciding section 203.

The motion/disparity-compensated prediction section 202 divides one block fed from the picture buffer 201 by different values and thereby obtains different-size bocks while being controlled by the encoding management section 101. For example, in the case where one block fed from the picture buffer 201 is composed of 16 by 16 pixels, different block sizes are equal to a value of 16 by 16 pixels, a value of 16 by 8 pixels, a value of 8 by 16 pixels, a value of 8 by 8 pixels, a value of 8 by 4 pixels, a value of 4 by 8 pixels, and a value of 4 by 4 pixels. For each of the different block sizes, the motion/disparity-compensated predicting section 202 implements motion/disparity-compensated prediction on a block-by-block basis. Thus, the motion/disparity-compensated predicting section 202 obtains results (motion vectors, disparity vectors, and motion/disparity-compensated prediction signals) of motion/disparity-compensated predictions for the respective block sizes.

In the case where disparity-compensated prediction should be performed, the encoding control section 101 sets the switch 210 in its ON state to feed a decoded picture or pictures as a reference picture or pictures to the motion/disparity-compensated predicting section 202 from the decoded picture buffer or buffers in an other picture encoding section or sections.

There are a plurality of candidate coding modes. Each of the candidate coding modes is defined by items including an item indicative of whether or not intra coding should be performed, an item indicative of whether or not motion-compensated prediction should be performed, an item indicative of whether or not disparity-compensated prediction should be performed, an item indicative of the number of a reference picture or pictures for motion-compensated prediction, an item indicative of the number of a reference picture or pictures for disparity-compensated prediction, an item indicative of which of decoded pictures should be used as a reference picture or pictures for motion-compensated prediction, an item indicative of which of decoded pictures should be used as a reference picture or pictures for disparity-compensated prediction, and an item indicative of a block size. Thus, the items defining each of the candidate coding modes include those for the motion/disparity-compensated prediction modes. The candidate coding modes include ones indicating respective different combinations of motion-compensated prediction, disparity-compensated prediction, a reference picture or pictures for motion-compensated prediction, a reference picture or pictures for disparity-compensated prediction, and a block size. The coding-mode deciding section 203 evaluates the candidate coding modes on the basis of the results of the motion/disparity-compensated predictions by the motion/disparity-compensated predicting section 202. The coding-mode deciding section 203 selects one from the candidate coding modes in accordance with the results of the evaluations. The selected coding mode corresponds to the best evaluation result. The coding-mode deciding section 203 labels the selected coding mode as a decided coding mode. The coding-mode deciding section 203 generates a final prediction signal and a final vector or vectors in accordance with the decided coding mode. The final vector or vectors include at least one of a motion vector or vectors and a disparity vector or vectors. The coding-mode deciding section 203 feeds the final prediction signal to the subtracter 204 and the adder 207. The coding-mode deciding section 203 feeds the final vector or vectors to the bitstream generating section 209. In addition, the coding-mode deciding section 203 feeds a signal representative of the decided coding mode to the bitstream generating section 209.

The coding-mode deciding section 203 makes a decision as to which of intra coding, motion-compensated prediction, and disparity-compensated prediction should be selected and combined, a decision as to which of candidate reference pictures should be used as a final reference picture or pictures, and a decision as to which of the different block sizes should be used in order to realize the most efficient encoding on a block-by-block basis. These decisions are made in stages of the selection of one from the candidate coding modes.

The subtracter 204 receives a signal from the picture buffer 201 which sequentially represents blocks of every picture to be encoded. For the current block, the subtracter 204 subtracts the final prediction signal from the output signal of the picture buffer 201 to generate a residual signal (a residual block). The subtracter 204 feeds the residual signal to the residual-signal encoding section 205. For the current block, the residual-signal encoding section 205 encodes the residual signal into a coded residual signal through signal processing inclusive of orthogonal transform and quantization. The residual-signal encoding section 205 feeds the coded residual signal to the residual-signal decoding section 206 and the bitstream generating section 209.

The encoding management section 101 decides whether or not a current picture represented by the coded residual signal should be at least one of a reference picture in motion-compensated prediction for a picture following the current picture in the encoding order and a reference picture in disparity-compensated prediction for a picture about another viewpoint. In the case where a current picture represented by the coded residual signal should be at least one of a reference picture in motion-compensated prediction for a picture following the current picture in the encoding order and a reference picture in disparity-compensated prediction for a picture about another viewpoint, the encoding management section 101 activates the residual-signal decoding section 206 to decode the coded residual signal into a decoded residual signal through signal processing inclusive of inverse quantization and inverse orthogonal transform. The decoding by the residual-signal decoding section 206 is inverse with respect to the encoding by the residual-signal encoding section 205. The residual-signal decoding section 206 feeds the decoded residual signal to the adder 207 on a block-by-block basis. The adder 207 receives the final prediction signal from the coding-mode deciding section 203. The adder 207 superimposes the decoded residual signal on the final prediction signal to generate a decoded picture signal. The adder 207 sequentially stores blocks of the decoded picture signal into the decoded picture buffer 208. The decoded picture signal can be fed from the decoded picture buffer 208 to the motion/disparity-compensated predicting section 202 as a reference picture for motion-compensated prediction. The switch 211 is connected between the decoded picture buffer 208 and an other picture encoding section or sections. When the switch 211 is set in its ON state by the encoding management section 101, the decoded picture signal can be fed from the decoded picture buffer 208 to an other picture encoding section or sections as a reference picture for disparity-compensated prediction implemented in the other picture encoding section or sections.

The bitstream generating section 209 receives the slice-related information from the encoding management section 101. The bitstream generating section 209 receives the coded residual signal from the residual-signal encoding section 205. The bitstream generating section 209 receives the coding-mode signal from the coding-mode deciding section 203. Furthermore, the bitstream generating section 209 receives the motion vector or vectors and the disparity vector or vectors from the coding-mode deciding section 203. For every block, the bitstream generating section 209 encodes the slice-related information, the coded residual signal, the coding-mode signal, the motion vector or vectors, and the disparity vector or vectors into the bitstream S(0), S(1), or S(2) through entropy encoding inclusive of Huffman encoding or arithmetic encoding.

In the picture encoding section of FIG. 9, the elements following the picture buffer 201 perform a sequence of the above-mentioned operation steps for each of blocks constituting every picture outputted from the picture buffer 201. Specifically, the elements following the picture buffer 201 perform a per-block sequence of the operation steps for each of blocks constituting one slice. Furthermore, the elements following the picture buffer 201 perform a per-slice sequence of the operation steps for each of slices constituting one access unit corresponding to every picture outputted from the picture buffer 201.

With reference back to FIG. 1, the coded bitstream generating section 102 outputs the coded bitstream inclusive of SPS, PPS, and SEI. The picture encoding sections 103, 104, and 105 output the coded bitstreams S(0), S(1), and S(2) about the viewpoints 0, 1, and 2 respectively. A multiplexing section (not shown) may multiplex the coded bitstream outputted from the coded bitstream generating section 102, and the coded bitstreams S(0), S(1), and S(2) into a multiplexed bitstream before outputting the multiplexed bitstream.

As previously mentioned, the view dependency counts for the respective viewpoints are encoded before being transmitted to the decoding side. The decoding side decodes the coded view dependency counts. As previously mentioned, the coded bitstreams of the respective viewpoints are transmitted to the decoding side. For example, the decoding side decodes the coded bitstreams in real time on a parallel processing basis. The decoding side derives desired delays of the start of decoding the coded bitstreams from the decoded view dependency counts. The decoding side starts decoding the coded bitstreams at timings accorded with the desired delays so that the picture-based synchronization among the coded bitstreams can be acquired. Therefore, the decoding of a coded picture of a viewpoint to generate a reference picture is surely completed before the start of the decoding of a coded picture of another viewpoint which uses the reference picture in disparity-compensated prediction.

Second Embodiment

Figure 10:
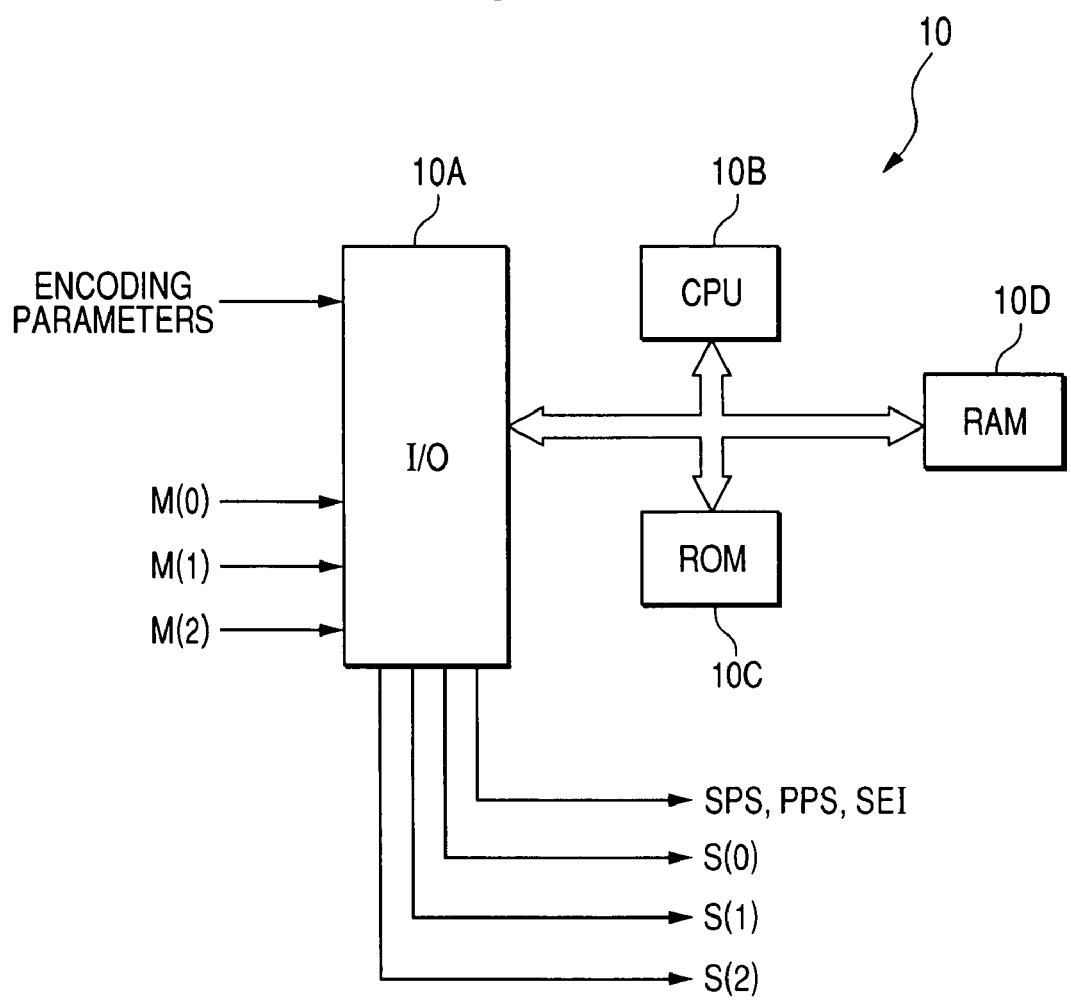
FIG. 10 is a block diagram of a multi-view video encoding apparatus according to a second embodiment of this invention.

FIG. 10 shows a multi-view video encoding apparatus according to a second embodiment of this invention. The encoding apparatus of FIG. 10 is similar to that of FIG. 1 except for design changes mentioned hereafter.

The encoding apparatus of FIG. 10 includes a computer system 10 having a combination of an input/output port 10A, a CPU 10B, a ROM 10C, and a RAM 10D. The input/output port 10A in the computer system 10 receives the encoding parameters and the video sequences M(O), M(1), and M(2). The computer system 10 processes the video sequences M(O), M(1), and M(2) into the coded bitstreams S(0), S(1), and S(2) respectively. The computer system 10 generates the coded bitstream inclusive of SPS, PPS, and SEI. The input/output port 10A outputs the coded bitstreams S(0), S(1), and S(2), and the coded bitstream inclusive of SPS, PPS, and SEI. The computer system 10 (the CPU 10B) operates in accordance with a control program, that is, a computer program stored in the ROM 10C or the RAM 10D.

Figure 11:
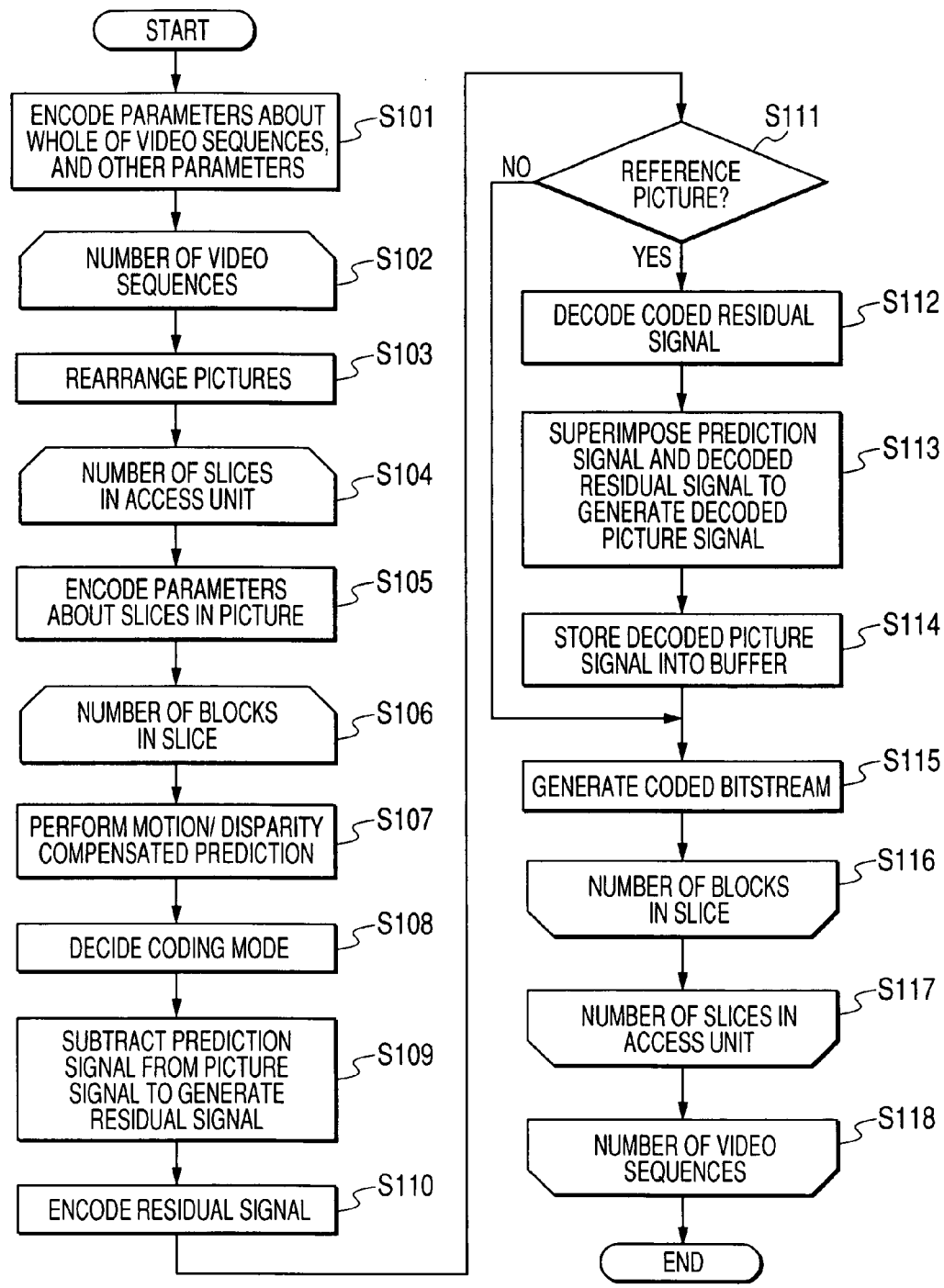
FIG. 11 is a flowchart of a segment of a control program for a computer system in FIG. 10.

FIG. 11 is a flowchart of a segment of the control program. In FIG. 11, loop points S102 and S118 indicate that a sequence of steps between them should be executed for each of the video sequences M(0), M(1), and M(2). Furthermore, loop points S104 and S117 indicate that a sequence of steps between them should be executed for each of slices constituting one access unit. In addition, loop points S106 and S116 indicate that a sequence of steps between them should be executed for each of blocks constituting one slice.

As shown in FIG. 11, a first step S101 of the program segment encodes the parameters about the whole of the video sequences, the parameters about pictures, and the parameters about supplemental enhancement information into a coded bitstream representative of an SPS (sequence parameter set), a PPS (picture parameter set), and SEI (supplemental enhancement information) prescribed by the MPEG-4 AVC/H.264 standards.

The decoding side decides whether or not each of the viewpoints concerning the respective incoming coded bitstreams is a base viewpoint. For each of the incoming coded bitstreams, the encoding apparatus generates a parameter which enables the decoding side to decide whether or not the related viewpoint is a base viewpoint. The generation of the parameter is implemented by the step S101. The encoding apparatus directly or indirectly encodes the generated parameter before sending its coded version to the decoding side. The directly or indirectly encoding is implemented by the step S101. Thus, the coded version of the parameter is contained in the coded bitstream generated by the step S101. The indirectly encoding is designed so that the decoding side can recover the original parameter through calculation from other parameters.

The view dependency counts for the respective viewpoints may be in a set before the set is encoded by the step S101 as a parameter about the whole of the video sequences. In this case, the view dependency counts for the respective viewpoints are encoded as one of the parameters in the SPS prescribed by the MPEG-4 AVC/H.264 standards through the use of the syntax structure in FIG. 5.

After the step S101, the program reaches a step S103 through the loop point S102. The step S103 rearranges pictures in the video sequence M(0), M(1), or M(2) from the display timing order to the picture encoding order. Then, the program advances from the step S103 to a step S105 through the loop point S104. The step S103 corresponds to the picture buffer 201 in FIG. 9.

There is information about slices constituting every picture. For every slice, the step S105 encodes the slice-related information into a portion (a VCL NAL unit prescribed by the MPEG-4 AVC/H.264 standards) of a coded bitstream S(0), S(1), or S(2). There are the viewpoint IDs for the respective video sequences M(0), M(1), and M(2). The step S105 adds the present viewpoint ID to the slice-related information before encoding the resultant slice-related information into a portion of the coded bitstream S(0), S(1), or S(2).

There are the view dependency counts for the viewpoints about the video sequences M(0), M(1), and M(2) respectively. The view dependency counts may be individually and separately encoded on a viewpoint-by-viewpoint basis. In this case, the step S105 adds the present view dependency count to the slice-related information before encoding the resultant slice-related information into a portion of the coded bitstream S(0), S(1), or S(2). Specifically, according to the syntax structure in FIG. 7, the view dependency count is encoded as one of parameters about each of slices constituting one picture. The view dependency count may not be encoded for every slice. Preferably, the view dependency count which differs from "0" is encoded for at least an access unit corresponding to a decoding start.

After the step S105, the program reaches a step S107 through the loop point S106. The step S107 performs the motion-compensated prediction in each of the different modes and the disparity-compensated prediction in each of the different modes for the current block. Accordingly, the step S107 detects a motion vector or vectors, a disparity vector or vectors, and generates a motion/disparity-compensated prediction block (a motion/disparity-compensated prediction signal) corresponding to the current block for each of the motion/disparity-compensated prediction modes. The step S107 implements the above actions for each of the different block sizes. The step S107 corresponds to the motion/disparity-compensated predicting section 202 in FIG. 9.

A step S108 following the step S107 decides a coding mode on the basis of the results of the motion/disparity-compensated prediction by the step S107 and the signals generated by the step S107. The step S110 generates a final prediction signal (a final prediction block) from one of the motion/disparity-compensated prediction signals according to the decided coding mode for the current block. The step S110 corresponds to the coding-mode deciding section 203 in FIG. 9.

A step S109 subsequent to the step S108 subtracts the final prediction signal from the current-block picture signal to generate the residual signal. The step S109 corresponds to the subtracter 204 in FIG. 9.

A step S110 following the step S109 encodes the residual signal into a coded residual signal through the signal processing inclusive of the orthogonal transform and the quantization for the current block. The step S110 corresponds to the residual-signal encoding section 205 in FIG. 9.

A step S111 subsequent to the step S110 decides whether or not the current picture represented by the coded residual signal should be at least one of a reference picture in motion-compensated prediction for a picture following the current picture in the encoding order and a reference picture in disparity-compensated prediction for a picture about another viewpoint. When the current picture should be at least one of the reference pictures, the program advances from the step S111 to a step S112. Otherwise, the program jumps from the step S111 to a step S115.

The step S112 decodes the coded residual signal into the decoded residual signal through the signal processing inclusive of the inverse quantization and the inverse orthogonal transform. The step S112 corresponds to the residual-signal decoding section 206 in FIG. 9.

A step S113 following the step S112 superimposes the decoded residual signal on the final prediction signal to generate the decoded picture signal. The step S113 corresponds to the adder 207 in FIG. 9.

A step S114 subsequent to the step S113 stores the decoded picture signal into the RAM 10D (a buffer). The decoded picture signal in the RAM 10D can be used as a reference picture for motion-compensated prediction. In addition, the decoded picture signal can be used as a reference picture for disparity-compensated prediction regarding another viewpoint. After the step S114, the program advances to the step S115.

For the current block, the step S115 encodes the coded residual signal, the signal representative of the decided coding mode, the motion vector or vectors, and the disparity vector or vectors into the bitstream S(0), S(1), or S(2) through the entropy encoding inclusive of the Huffman encoding or the arithmetic encoding. Then, the program exits from the step S115 and passes through the loop points S116, S117, and S118 before the current execution cycle of the program segment ends. The step S115 corresponds to the bitstream generating section 209 in FIG. 9.

Third Embodiment

Figure 12:
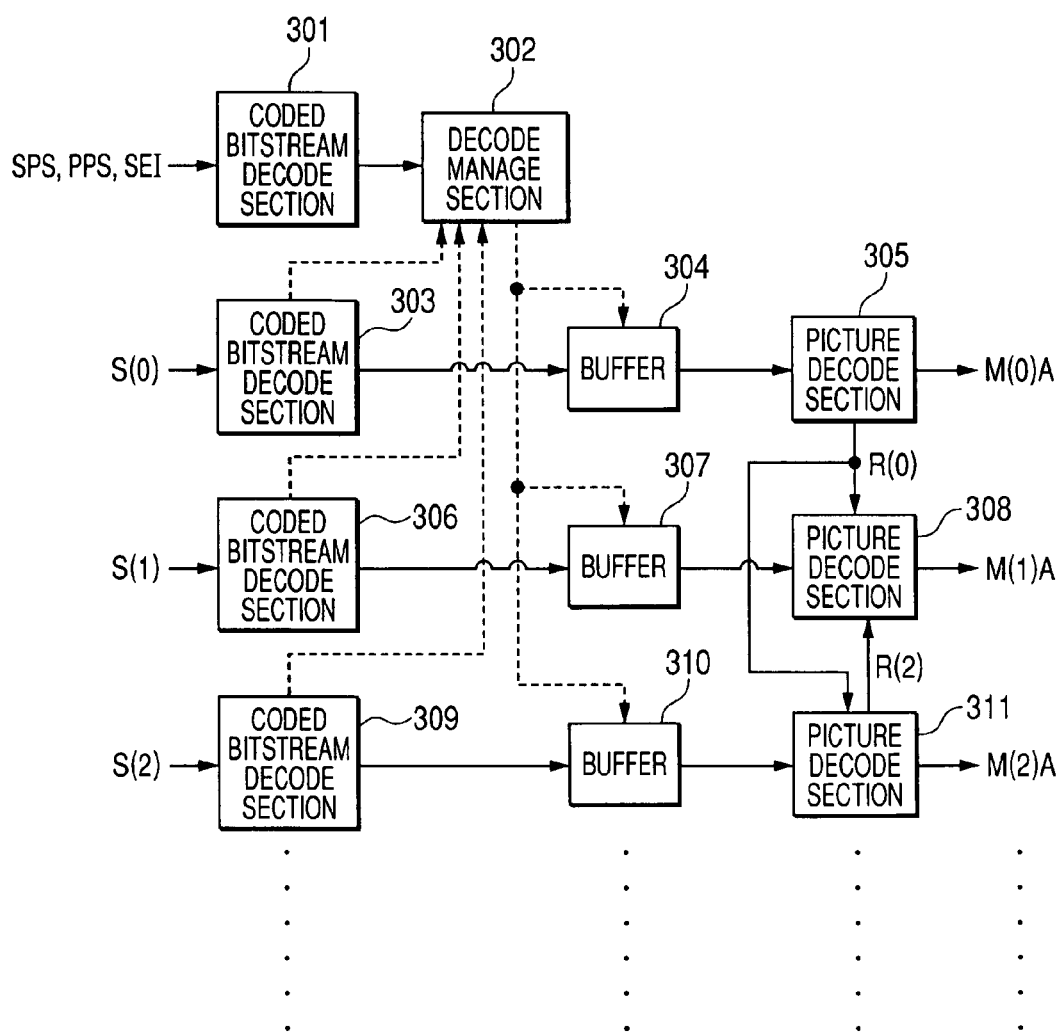
FIG. 12 is a block diagram of a multi-view video decoding apparatus according to a third embodiment of this invention.

FIG. 12 shows a multi-view video decoding apparatus according to a third embodiment of this invention. The decoding apparatus receives the coded bitstream inclusive of SPS, PPS, and SEI, and the different-viewpoint coded bitstreams S(v) from the encoding apparatus of FIG. 1 or FIG. 10, where "v" denotes an ID for each viewpoint, and v=0, 1, 2, .... The decoding apparatus decodes the coded bitstream inclusive of SPS, PPS, and SEI. Furthermore, the decoding apparatus decodes the different-viewpoint coded bitstreams S(v) into different-viewpoint decoded video sequences M(v)A.

The decoding apparatus of FIG. 12 is extended from a decoding apparatus conforming to the MPEG-4 AVC/H.264 standards. Thus, the decoding apparatus of FIG. 12 has a basic portion designed to conform to the MPEG-4 AVC/H.264 standards.

As shown in FIG. 12, the decoding apparatus includes coded-bitstream decoding sections 301, 303, 306, and 309, a decoding management section 302, buffers (buffer memories) 304, 307, and 310, and picture decoding sections 305, 308, and 311.

The coded-bitstream decoding section 301 receives the coded bitstream inclusive of SPS, PPS, and SEI assigned the parameters about the whole of the video sequences, the parameters about pictures, and the parameters about the supplemental enhancement information. The coded-bitstream decoding section 301 decodes the received coded bitstream, thereby recovering the parameters about the whole of the video sequences, the parameters about pictures, and the parameters about the supplemental enhancement information. The coded-bitstream decoding section 301 feeds the decoding management section 302 with the decoded parameters about the whole of the video sequences, the decoded parameters about pictures, and the decoded parameters about the supplemental enhancement information (SEI).

In the case where the encoding apparatus combines the view dependency counts for the respective viewpoints in a set before encoding the set as a parameter about the whole of the video sequences, the coded-bitstream decoding section 301 recovers the view dependency counts according to the syntax structure in FIG. 5. In the case of conformity to MPEG-4 AVC/H.264, the view dependency counts are coded in the SPS or SEI etc. of the coded bitstream. The coded-bitstream decoding section 301 feeds the recovered view dependency counts to the decoding management section 302. In the decoding management section 302, the default values of the view dependency counts for the respective viewpoints are "0". The decoding management section 302 updates the view dependency counts from "0" to the values represented by the decoded ones fed from the coded-bitstream decoding section 301.

The coded-bitstream decoding sections 303, 306, and 309 receive the coded bitstreams S(0), S(1), and S(2) about the viewpoints 0, 1, and 2, respectively. It should be noted that there may be more than three coded-bitstream decoding sections assigned to coded bitstreams about different viewpoints respectively.

The coded-bitstream decoding section 303 decodes specified data in the coded bitstream S(0). The specified data represents parameters about slices constituting a picture from the viewpoint 0 and encoded as a header of a VCL NAL unit and a slice header prescribed by the MPEG-4 AVC/H.264 standards. Thus, the coded-bitstream decoding section 303 recovers the parameters about slices constituting a picture from the viewpoint 0. The coded-bitstream decoding section 303 feeds the recovered slice-related parameters to the decoding management section 302. The coded-bitstream decoding section 303 does not decode portions of the coded bitstream S(0) which represent the coding mode, motion vectors, disparity vectors, and DCT coefficients for every multi-pixel block.

Similarly, the coded-bitstream decoding section 306 decodes specified data in the coded bitstream S(1), thereby recovering parameters about slices constituting a picture from the viewpoint 1. The coded-bitstream decoding section 306 feeds the recovered slice-related parameters to the decoding management section 302. The coded-bitstream decoding section 309 decodes specified data in the coded bitstream S(2), thereby recovering parameters about slices constituting a picture from the viewpoint 2. The coded-bitstream decoding section 309 feeds the recovered slice-related parameters to the decoding management section 302.

In the case where the encoding apparatus encodes the view dependency counts individually and separately on a viewpoint-by-viewpoint basis, the coded-bitstream decoding sections 303, 306, and 309 decode the coded versions of the view dependency counts as ones of parameters about slices constituting pictures from the viewpoints 0, 1, and 2 according to the syntax structure in FIG. 7. In the case of conformity to MPEG-4 AVC/H.264, the view dependency counts are coded in the header of VCL NAL unit for or slice header etc. of the coded bitstream. Thus, in this case, the coded-bitstream decoding sections 303, 306, and 309 recover the values of the view dependency counts for the viewpoints 0, 1, and 2 respectively. The coded-bitstream decoding sections 303, 306, and 309 notifies the recovered values of the view dependency counts to the decoding management section 302. In the decoding management section 302, the default values of the view dependency counts for the respective viewpoints are "0". The decoding management section 302 updates the view dependency counts from "0" to the values notified by the coded-bitstream decoding sections 303, 306, and 309.

The coded-bitstream decoding sections 303, 306, and 309 pass the non-decoded portions of the coded bitstreams S(0), S(1), and S(2) to the buffers 304, 307, and 310, respectively. The non-decoded portions of the coded bitstreams S(0), S(1), and S(2) represent the coding mode, motion vectors, disparity vectors, and DCT coefficients for every multi-pixel block. The buffers 304, 307, and 310 store the non-decoded portions of the coded bitstreams S(0), S(1), and S(2), respectively. The data stored in each of the buffers 304, 307, and 310 periodically corresponds to all slices constituting one access unit. It should be noted that there may be more than three buffers for coded bitstreams about different viewpoints respectively.

The decoding management section 302 performs decoding-related management on the basis of the parameters about the whole of the video sequences, the parameters about pictures, and the parameters about slices constituting pictures. The parameters about the whole of the video sequences, and the parameters about pictures are fed from the coded-bitstream decoding section 301. The parameters about slices constituting pictures are fed from the coded-bitstream decoding sections 303, 306, and 309.

The decoding of the non-decoded portions of the coded bitstream about the base viewpoint (the viewpoint 0) does not refer to a decoded picture or pictures concerning an other viewpoint or viewpoints as a reference picture or pictures. The start timing of the decoding of the non-decoded portions of a coded bitstream about a viewpoint different from the base viewpoint is delayed from that of the decoding of the non-decoded portions of the coded bitstream about the base viewpoint. The decoding management section 302 decides whether or not each of the viewpoints is a base viewpoint on the basis of the fed parameters. Specifically, for each of the viewpoints, the decoding management section 302 checks whether or not the related view dependency count is "0". When the related view dependency count is "0", the decoding management section 302 decides that the present viewpoint is a base viewpoint. On the other hand, when the related view dependency count differs from "0", the decoding management section 302 decides that the present viewpoint is not a base viewpoint. The decoding management section 302 manages the start timings of the decoding of the non-decoded portions of the coded bitstreams in accordance with the view dependency counts. Specifically, the decoding management section 302 manages decoding clock signals for starting the decoding of the non-decoded portions of the coded bitstreams about the respective viewpoints. At every timing, the decoding management section 302 decides whether or not the decoding of the non-decoded portions of each of the coded bitstreams should be started. The decoding management section 302 uses the results of this decision in the management of the decoding start timings. The decoding management section 302 delays or non-delays the start timing of the decoding of the non-decoded portions of each coded bitstream in accordance with the related view dependency count.

The buffers 304, 307, and 310 store the non-decoded portions of the coded bitstreams S(0), S(1), and S(2) fed from the coded-bitstream decoding sections 303, 306, and 309 respectively and representing the coding mode, motion vectors, disparity vectors, and DCT coefficients for every multi-pixel block. The coded bitstreams S(0), S(1), and S(2) are read out from the buffers 304, 307, and 310 on an access-unit by access-unit basis. Regarding the management of the decoding start timings, the decoding management section 302 determines desired decoding start timings for the respective viewpoints. When the present moment reaches the desired decoding start timing for the viewpoint 0, the decoding management section 302 controls the buffer 304 to output one access unit of the coded bitstream S(0) to the picture decoding section 305. At the same time, the decoding management section 302 controls the picture decoding section 305 to start decoding the access unit of the coded bitstream S(0). Similarly, when the present moment reaches the desired decoding start timing for the viewpoint 1, the decoding management section 302 controls the buffer 307 to output one access unit of the coded bitstream S(1) to the picture decoding section 308. At the same time, the decoding management section 302 controls the picture decoding section 308 to start decoding the access unit of the coded bitstream S(1). When the present moment reaches the desired decoding start timing for the viewpoint 2, the decoding management section 302 controls the buffer 310 to output one access unit of the coded bitstream S(2) to the picture decoding section 311. At the same time, the decoding management section 302 controls the picture decoding section 311 to start decoding the access unit of the coded bitstream S(2).

A further description will be given of the case where the picture decoding order is that in FIG. 3. With reference to FIG. 3, there are coded versions of pictures taken from the viewpoints 0, 1, 2, . . . , and 7. Thus, in addition to the coded-bitstream decoding sections 303, 306, and 309, there are five other coded-bitstream decoding sections provided in parallel and assigned to the viewpoints 3, 4, 5, 6, and 7 respectively. In addition to the buffers 304, 307, and 310 of FIG. 12, there are five other buffers provided in parallel and assigned to the viewpoints 3, 4, 5, 6, and 7 respectively. In addition to the picture decoding sections 305, 308, and 311, there are five other picture decoding sections provided in parallel and assigned to the viewpoints 3, 4, 5, 6, and 7 respectively.

The decoding management section 302 sets a counter (an access-unit time counter) to "0". The decoding management section 302 decides whether or not the coded bitstream in the buffer assigned to the base viewpoint (the viewpoint 0) corresponds to all slices constituting one access unit. The decoding management section 302 identifies the base viewpoint from the fact that the related view dependency count is "0". The decoding management section 302 waits until the coded bitstream in the buffer assigned to the base viewpoint corresponds to all slices constituting one access unit. After the coded bitstream in the buffer assigned to the base viewpoint corresponds to all slices constituting one access unit, the decoding management section 302 controls the buffer 304 to output an access unit of a first picture P(0, 0) concerning the viewpoint 0 to the picture decoding section 305. At the same time, the decoding management section 302 controls the picture decoding section 305 to decode the access unit of the picture P(0, 0). At this time, the decoding management section 302 operates not to decode the coded bitstreams about the viewpoints 1-7 for which the view dependency counts are greater than "0". Accordingly, the decoding management section 302 delays the decoding of the coded bitstreams about the viewpoints 1-7 relative to the decoding of the coded bitstream about the viewpoint 0 (the base viewpoint). The decoding management section 302 increments the counter from "0" to "1" for a time interval corresponding to one access unit.

Next, the decoding management section 302 detects, among the viewpoints, those viewpoints for which the view dependency counts are equal to or smaller than "1" (the current value of the counter). Specifically, the decoding management section 302 detects the viewpoints 0 and 2 as such viewpoints. Then, the decoding management section 302 controls the buffers 304 and 310 to output an access unit of a picture P(0, 4) concerning the viewpoint 0 and an access unit of a first picture P(2, 0) concerning the viewpoint 2 to the picture decoding sections 305 and 311 respectively on a simultaneous parallel basis. At the same time, the decoding management section 302 controls the picture decoding sections 305 and 311 to decode the access unit of the picture P(0, 4) and the access unit of the picture P(2, 0) on a simultaneous parallel basis. At this time, the decoding management section 302 operates not to decode the coded bitstreams about the viewpoints 1, and 3-7 for which the view dependency counts are greater than "1" (the current value of the counter). Accordingly, the decoding management section 302 further delays the decoding of the coded bitstreams about the viewpoints 1, and 3-7. The decoding management section 302 increments the counter from "1" to "2" for a time interval corresponding to one access unit.

Subsequently, the decoding management section 302 detects, among the viewpoints, those viewpoints for which the view dependency counts are equal to or smaller than "2" (the current value of the counter). Specifically, the decoding management section 302 detects the viewpoints 0, 1, 2, and 4 as such viewpoints. Then, for the viewpoints 0, 1, 2, and 4, the decoding management section 302 controls the buffers to output an access unit of a picture P(0, 2) concerning the viewpoint 0, an access unit of a first picture P(1, 0) concerning the viewpoint 1, an access unit of a picture P(2, 4) concerning the viewpoint 2, and an access unit of a first picture P(4, 0) concerning the viewpoint 4 to the picture decoding sections respectively on a simultaneous parallel basis. At the same time, the decoding management section 302 controls the picture decoding sections to decode the access unit of the picture P(0, 2), the access unit of the picture P(1, 0), the access unit of the picture P(2, 4), and the access unit of the picture P(4, 0) on a simultaneous parallel basis. At this time, the decoding management section 302 operates not to decode the coded bitstreams about the viewpoints 3, and 5-7 for which the view dependency counts are greater than "2" (the current value of the counter). Accordingly, the decoding management section 302 further delays the decoding of the coded bitstreams about the viewpoints 3, and 5-7. The decoding management section 302 increments the counter from "2" to "3" for a time interval corresponding to one access unit.

Next, the decoding management section 302 detects, among the viewpoints, those viewpoints for which the view dependency counts are equal to or smaller than "3" (the current value of the counter). Specifically, the decoding management section 302 detects the viewpoints 0-4 and 6 as such viewpoints. Then, for the viewpoints 0-4 and 6, the decoding management section 302 controls the buffers to output an access unit of a picture P(0, 1) concerning the viewpoint 0, an access unit of a picture P(1, 4) concerning the viewpoint 1, an access unit of a picture P(2, 2) concerning the viewpoint 2, an access unit of a first picture P(3, 0) concerning the viewpoint 3, an access unit of a picture P(4, 4) concerning the viewpoint 4, and an access unit of a first picture P(6, 0) concerning the viewpoint 6 to the picture decoding sections respectively on a simultaneous parallel basis. At the same time, the decoding management section 302 controls the picture decoding sections to decode the access unit of the picture P(0, 1), the access unit of the picture P(1, 4), the access unit of the picture P(2, 2), the access unit of the picture P(3, 0), the access unit of the picture P(4, 4), and the access unit of the picture P(6, 0) on a simultaneous parallel basis. At this time, the decoding management section 302 operates not to decode the coded bitstreams about the viewpoints 5 and 7 for which the view dependency counts are greater than "3" (the current value of the counter). Accordingly, the decoding management section 302 further delays the decoding of the coded bitstreams about the viewpoints 5 and 7. The decoding management section 302 increments the counter from "3" to "4" for a time interval corresponding to one access unit.

Subsequently, the decoding management section 302 detects, among the viewpoints, those viewpoints for which the view dependency counts are equal to or smaller than "4" (the current value of the counter). Specifically, the decoding management section 302 detects the viewpoints 0-7 as such viewpoints. Then, for the viewpoints 0-7, the decoding management section 302 controls the buffers to output an access unit of a picture P(0, 3) concerning the viewpoint 0, an access unit of a picture P(1, 2) concerning the viewpoint 1, an access unit of a picture P(2, 1) concerning the viewpoint 2, an access unit of a first picture P(3, 4) concerning the viewpoint 3, an access unit of a picture P(4, 2) concerning the viewpoint 4, an access unit of a first picture P(5, 0) concerning the viewpoint 5, an access unit of a picture P(6, 4) concerning the viewpoint 6, and an access unit of a first picture P(7, 0) concerning the viewpoint 7 to the picture decoding sections respectively on a simultaneous parallel basis. At the same time, the decoding management section 302 controls the picture decoding sections to decode the access unit of the picture P(0, 3), the access unit of the picture P(1, 2), the access unit of the picture P(2, 1), the access unit of the picture P(3, 4), the access unit of the picture P(4, 2), the access unit of the picture P(5, 0), the access unit of the picture P(6, 4), and the access unit of the picture P(7, 0) on a simultaneous parallel basis.

Thereafter, all the coded bitstreams about the respective viewpoints 0-7 are decoded on a simultaneous parallel basis for every access unit.

The picture decoding section 305 receives the coded bitstream S(0) of the viewpoint 0 on an access-unit by access-unit basis. The picture decoding section 305 decodes the coded bitstream S(0) into a decoded video sequence M(0)A of the viewpoint 0 for every access unit while being controlled by the decoding management section 302. The picture decoding section 308 receives the coded bitstream S(1) of the viewpoint 0 on an access-unit by access-unit basis. The picture decoding section 308 receives reference pictures R(0) and R(2) from the picture decoding sections 305 and 311 respectively. The picture decoding section 308 decodes the coded bitstream S(1) into a decoded video sequence M(1)A of the viewpoint 1 through the use of the reference pictures R(0) and R(2) for every access unit while being controlled by the decoding management section 302. The picture decoding section 311 receives the coded bitstream S(2) of the viewpoint 2 on an access-unit by access-unit basis. The picture decoding section 311 receives a reference picture R(0) from the picture decoding section 305. The picture decoding section 311 decodes the coded bitstream S(2) into a decoded video sequence M(2)A of the viewpoint 2 through the use of the reference picture R(0) for every access unit while being controlled by the decoding management section 302.

The picture decoding sections 305, 308, and 311 output the decoded video sequences M(0)A, M(1)A, and M(2)A, respectively. Preferably, the picture decoding sections 305, 308, and 311 are of the same structure. Accordingly, a picture decoding section used as each of the picture decoding sections 305, 308, and 311 will be described in detail hereafter.

Figure 13:
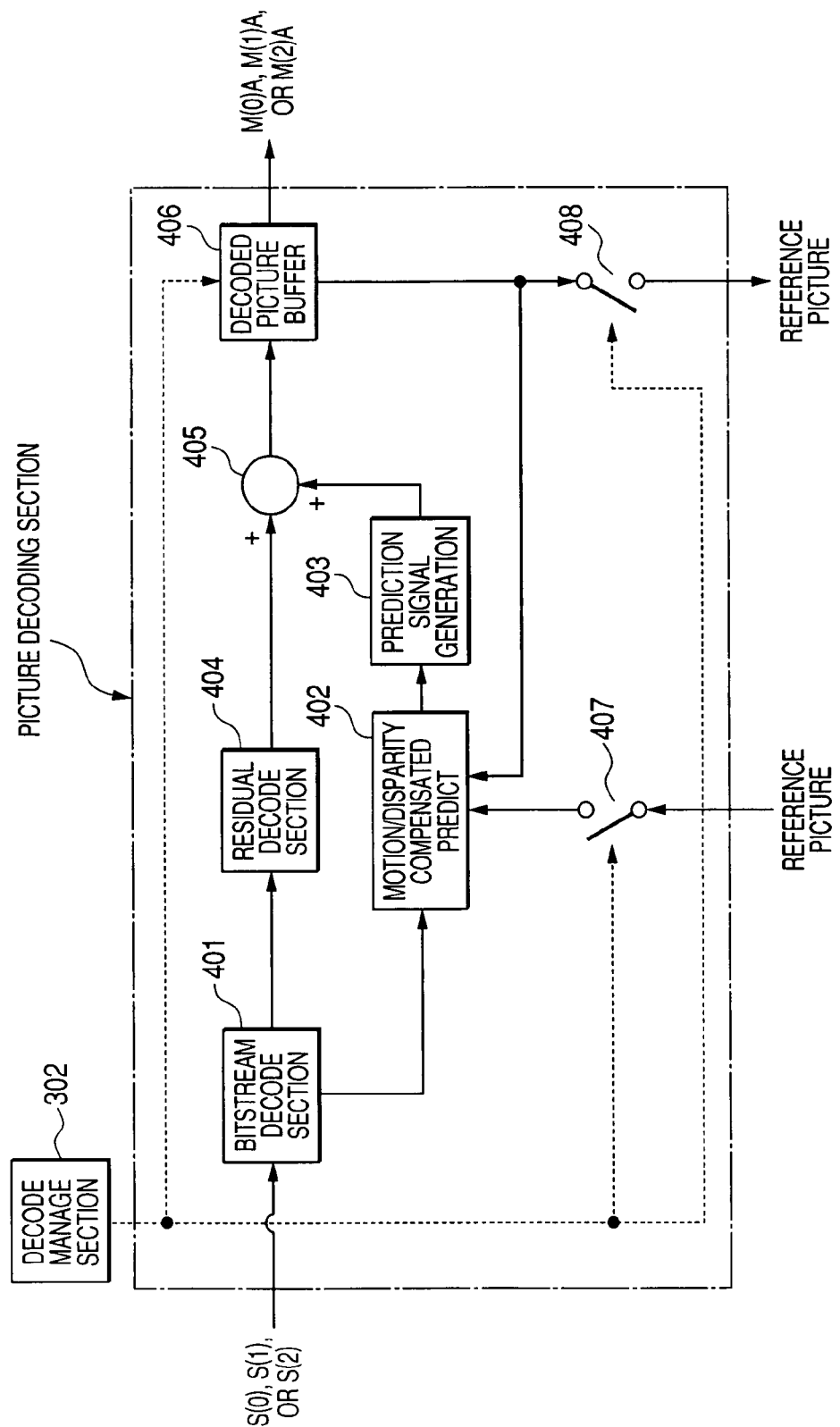
FIG. 13 is a block diagram of a picture decoding section in the decoding apparatus of FIG. 12.

As shown in FIG. 13, a picture decoding section (the picture decoding section 305, 308, or 311) includes a bitstream decoding section 401, a motion/disparity-compensated predicting section 402, a prediction-signal generating section 403, a residual-signal decoding section 404, an adder 405, a decoded picture buffer 406, and switches 407 and 408. The devices and sections 401-408 are controlled by the decoding management section 302.

The motion/disparity-compensated predicting section 402 is connected to an other picture decoding section or sections via the switch 407. When the switch 407 is set in its ON state, the motion/disparity-compensated predicting section 402 can receive a reference picture or pictures from the other picture decoding section or sections.

The switch 408 is connected between the decoded picture buffer 406 and an other picture decoding section or sections. When the switch 408 is set in its ON state, a decoded picture signal can be fed from the decoded picture buffer 406 to the other picture decoding section or sections as a reference picture for disparity-compensated prediction in the other picture decoding section or sections.

In the case where the decoding management section 302 sets the switch 407 in its OFF state while setting the switch 408 in its ON state, the picture decoding section of FIG. 13 operates as the picture decoding section 305. In the case where the decoding management section 302 sets the switch 407 in its ON state while setting the switch 408 in its OFF state, the picture decoding section of FIG. 13 operates as the picture decoding section 308. In the case where the decoding management section 302 sets the switches 407 and 408 in their ON states, the picture decoding section of FIG. 13 operates as the picture decoding section 311.

With reference to FIG. 13, the bitstream decoding section 401 receives the coded bitstream S(0), S(1), or S(2). The bitstream decoding section 401 decodes the coded bitstream S(0), S(1), or S(2) into a coding-mode signal, a motion vector or vectors, a disparity vector or vectors, and a coded residual signal on a block-by-block basis. The operation of the bitstream decoding section 401 is substantially inverse with respect to the operation of the bitstream generating section 209 in FIG. 9. The bitstream decoding section 401 feeds the coding-mode signal to the decoding management section 302. The bitstream decoding section 401 feeds the motion vector or vectors and the disparity vector or vectors to the motion/disparity-compensated predicting section 402. The bitstream decoding section 401 feeds the coded residual signal to the residual-signal decoding section 404.

The decoding management section 302 detects, from the coding-mode signal, a mode of the encoding of an original block corresponding to every block handled by the bitstream decoding section 401. The detected coding mode describes a set of items including an item indicating which one or ones of motion-compensated prediction and disparity-compensated prediction have been used in the encoding of the original block, an item indicating which one or ones of pictures have been used as a reference picture or pictures in the encoding of the original block, and an item indicating the size of a block divided from the original block. The decoding management section 302 controls the devices and sections 401-408 in accordance with the detected coding mode.

In the case where the detected coding mode indicates that the original block corresponding to the current block handled by the picture decoding section has been subjected to motion-compensated prediction, the decoding management section 302 controls the motion/disparity-compensated predicting section 402 to implement motion-compensated prediction from a reference picture or pictures in response to the motion vector or vectors, and thereby generate a motion-compensated prediction block (a motion-compensated prediction signal). In this case, the reference picture or pictures are fed from the decoded picture buffer 406. The motion/disparity-compensated predicting section 402 feeds the motion-compensated prediction block to the prediction-signal generating section 403.

In the case where the detected coding mode indicates that the original block corresponding to the current block handled by the picture decoding section has been subjected to disparity-compensated prediction, the decoding management section 302 sets the switch 407 in its ON state so that the switch 407 passes a reference picture or pictures to the motion/disparity-compensated predicting section 402 from the decoded picture buffer or buffers in the other picture decoding section or sections. In this case, the decoding management section 302 controls the motion/disparity-compensated predicting section 402 to implement disparity-compensated prediction from the reference picture or pictures in response to the disparity vector or vectors, and thereby generate a disparity-compensated prediction block (a disparity-compensated prediction signal). The motion/disparity-compensated predicting section 402 feeds the disparity-compensated prediction block to the prediction-signal generating section 403.

For the current block, the prediction-signal generating section 403 generates a final prediction signal from at least one of the motion-compensated prediction block and the disparity-compensated prediction block while being controlled by the decoding management section 302 in accordance with the detected coding mode. The prediction-signal generating section 403 feeds the final prediction signal to the adder 405.

The residual-signal decoding section 404 decodes the coded residual signal into a decoded residual signal through signal processing inclusive of inverse quantization and inverse orthogonal transform. The residual-signal decoding section 404 feeds the decoded residual signal to the adder 405 on a block-by-block basis. The adder 405 superimposes the decoded residual signal on the final prediction signal to generate a decoded picture signal. The adder 405 sequentially stores blocks of the decoded picture signal into the decoded picture buffer 406.

The decoded picture signal can be fed from the decoded picture buffer 406 to the motion/disparity-compensated predicting section 402 as a reference picture for motion-compensated prediction. When the switch 408 is set in its ON state by the decoding management section 302, the decoded picture signal can be fed from the decoded picture buffer 406 to the other picture decoding section or sections as a reference picture for disparity-compensated prediction.

In the picture decoding section of FIG. 13, the bitstream decoding section 401 and the subsequent elements perform a sequence of the above-mentioned operation steps for each of blocks constituting every picture represented by the coded bitstream S(0), S(1), or S(2). Specifically, the bitstream decoding section 401 and the subsequent elements perform a per-block sequence of the operation steps for each of blocks constituting one slice. Furthermore, the bitstream decoding section 401 and the subsequent elements perform a per-slice sequence of the operation steps for each of slices constituting one access unit corresponding to every picture represented by the coded bitstream S(0), S(1), or S(2).

The decoded picture buffer 406 sequentially outputs picture-corresponding segments of the decoded picture signal to, for example, a display device in the display timing order as a decoded video sequence M(0)A, M(1)A, or M(2)A while being controlled by the decoding management section 302.

There may be a demultiplexing section for handling a multiplexed bitstream containing the coded bitstream inclusive of SPS, PPS, and SEI, and the coded bitstreams S(0), S(1), and S(2). The demultiplexing section separates the multiplexed bitstream into NAL units prescribed by the MPEG-4 AVC/H.264 standards. The demultiplexing section decodes the headers of the respective NAL units to detect the types of the NAL units. The demultiplexing section classifies the NAL units according to their types. The demultiplexing section feeds the coded-bitstream decoding section 301 with NAL units of the types which represent the parameters about the whole of the video sequences, the parameters about pictures, and the parameters about supplemental enhancement information (SEI). The demultiplexing section classifies NAL units of the types concerning picture slice information (VCL NAL units) into the coded bitstreams S(0), S(1), and S(2) according to the viewpoint IDs therein.

As previously mentioned, the coded bitstreams of the respective viewpoints are decoded in real time on a parallel processing basis. Preferably, one coded bitstream is decoded by one picture decoding section. The number of viewpoints and the number of picture decoding sections may differ from each other. For example, 8 coded bitstreams of respective viewpoints may be decoded by 4 picture decoding sections. In this case, two coded bitstreams are assigned one picture decoding section, and the period of the decoding of one access unit is halved. For example, the coded bitstreams of the viewpoints 0 and 1 are decoded by one picture decoding section. During an exemplary decoding interval, one of an access unit representing a coded picture P(0, 2) of the viewpoint 0 and an access unit representing a coded picture P(1, 0) of the viewpoint 1 is decoded before the other is decoded.

The encoding apparatus encodes the view dependency counts for the respective viewpoints before sending the coded versions of the view dependency counts to the decoding apparatus. The decoding apparatus decodes the coded view dependency counts. The encoding apparatus sends the coded bitstreams of the respective viewpoints to the decoding apparatus. The decoding apparatus decodes the coded bitstreams in real time on a parallel processing basis. The decoding apparatus derives desired delays of the start of decoding the coded bitstreams from the decoded view dependency counts. The decoding apparatus starts decoding the coded bitstreams at timings accorded with the desired delays so that the picture-based synchronization among the coded bitstreams can be acquired. Therefore, the decoding of a coded picture of a viewpoint to generate a reference picture is surely completed before the start of the decoding of a coded picture of another viewpoint which uses the reference picture in disparity-compensated prediction. Accordingly, the parallel processing for the real-time decoding of the coded bitstreams is efficient.

Fourth Embodiment

Figure 14:
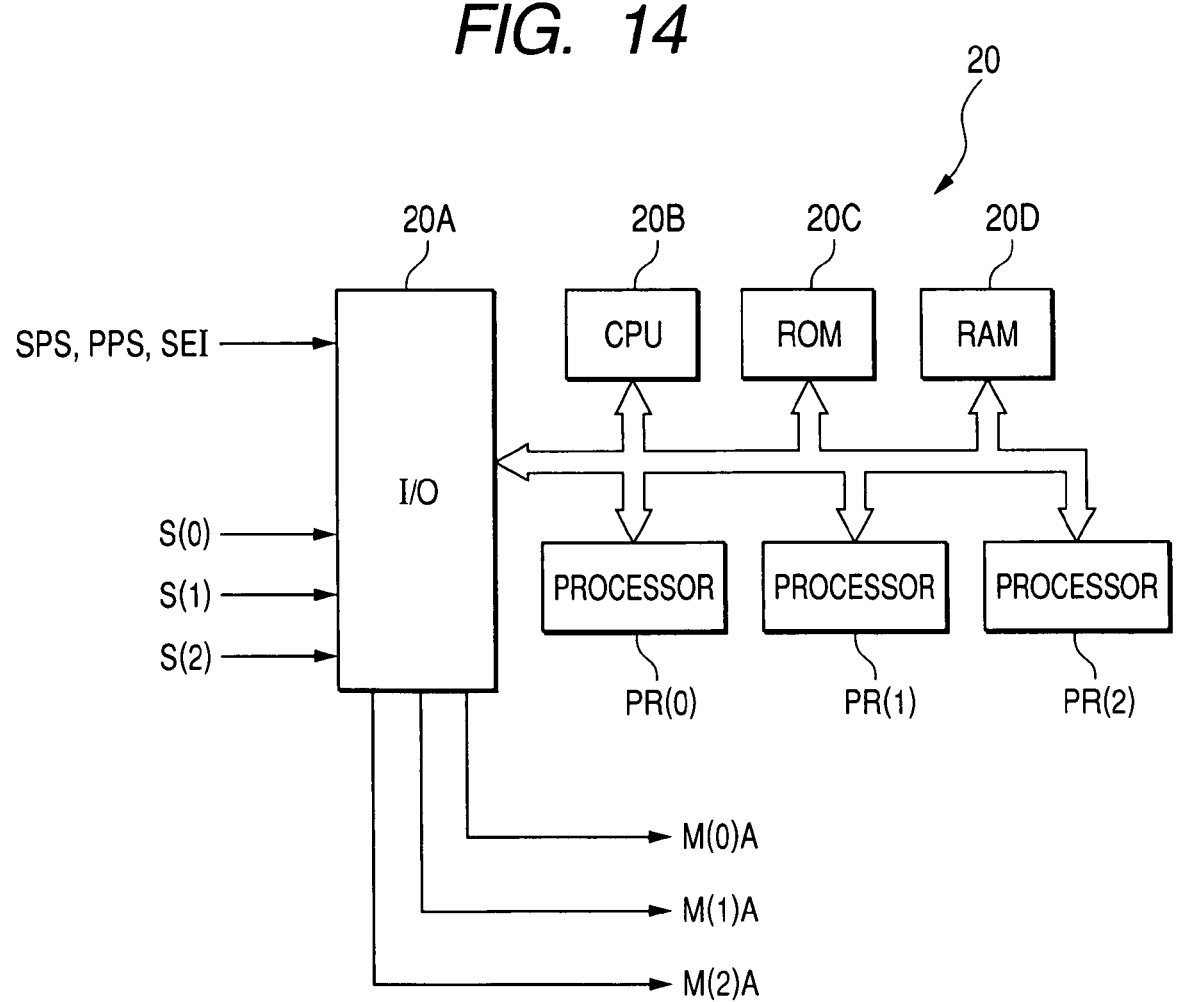
FIG. 14 is a block diagram of a multi-view video decoding apparatus according to a fourth embodiment of this invention.

FIG. 14 shows a multi-view video decoding apparatus according to a fourth embodiment of this invention. The decoding apparatus of FIG. 14 is similar to that of FIG. 12 except for design changes mentioned hereafter.

The decoding apparatus of FIG. 14 includes a computer system 20 having a combination of an input/output port 20A, a CPU 20B, a ROM 20C, a RAM 20D, and processors PR(0), PR(1), and PR(2). The input/output port 20A receives the coded bitstream inclusive of SPS, PPS, and SEI, and the coded bitstreams S(0), S(1), and S(2) of the respective viewpoints 0, 1, and 2. The computer system 20 decodes the coded bitstream inclusive of SPS, PPS, and SEI. The computer system 20 decodes the coded bitstreams S(0), S(1), and S(2) into the decoded view sequences M(0)A, M(1)A, and M(2)A of the respective viewpoints 0, 1, and 2. The input/output port 20A outputs the decoded view sequences M(0)A, M(1)A, and M(2)A.

The CPU 20B in the computer system 20 operates in accordance with a control program (a computer program) stored in the ROM 20C or the RAM 20D. The processors PR(0), PR(1), and PR(2) are assigned to the coded bitstreams S(0), S(1), and S(2), respectively. The processors PR(0), PR(1), and PR(2) decode the coded bitstreams S(0), S(1), and S(2) into the decoded view sequences M(0)A, M(1)A, and M(2)A in real time on a parallel processing basis. The processors PR(0), PR(1), and PR(2) are similar in structure. Each of the processors PR(0), PR(1), and PR(2) operates in accordance with a control program (a computer program) stored in its internal memory. The control program is designed so that each of the processors PR(0), PR(1), and PR(2) will act as a decoder. Each of the processors PR(0), PR(1), and PR(2) includes a coded bitstream buffer and a decoded picture buffer.

Figure 15:
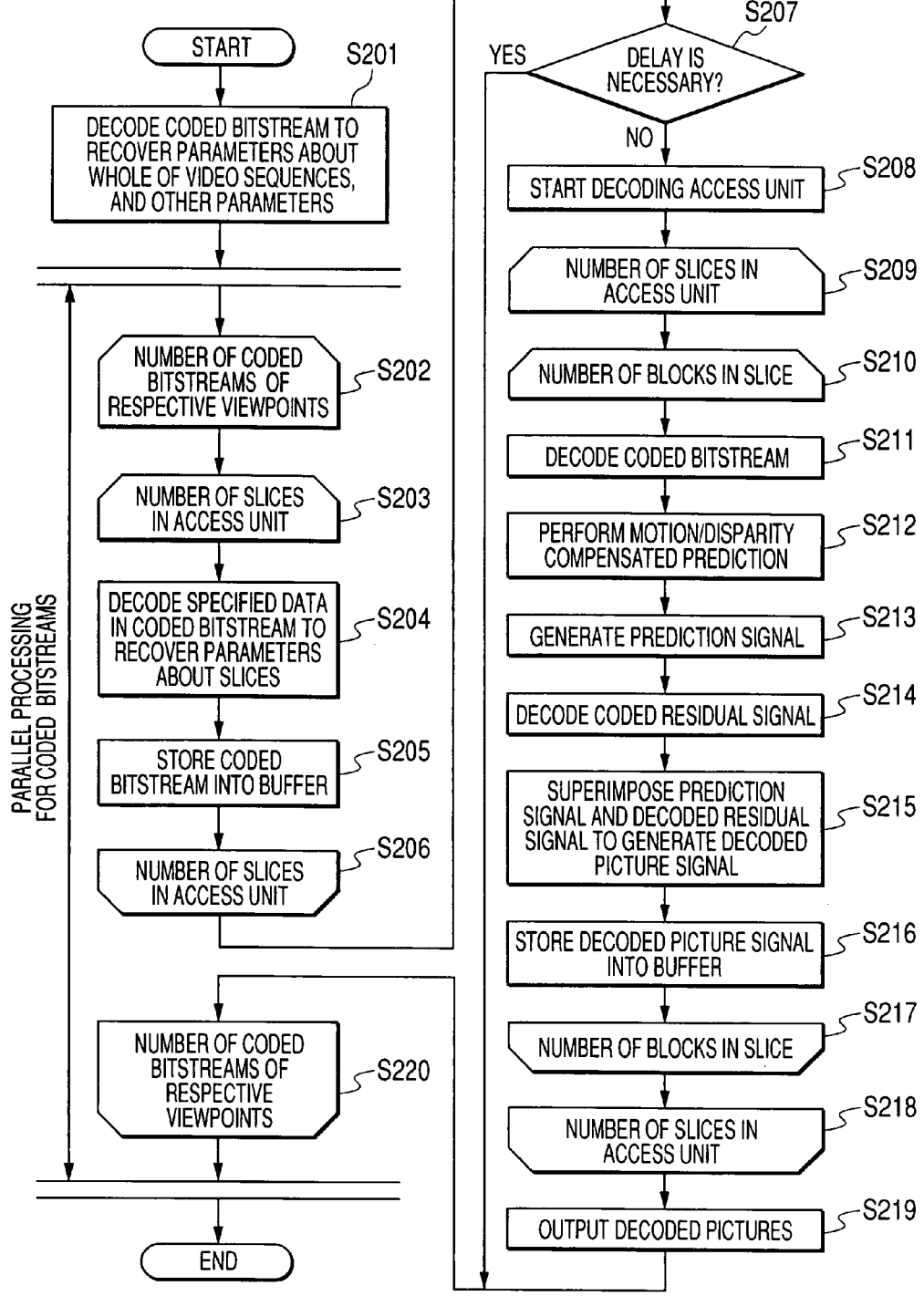
FIG. 15 is a flowchart of control programs for a CPU and a processor in FIG. 14.

FIG. 15 is a flowchart of a segment of the control program for the CPU 20B and a segment of the control program for each of the processors PR(0), PR(1), and PR(2). The segment of the control program for the CPU 20B has a step S201. The segment of the control program for each of the processors PR(0), PR(1), and PR(2) has loop points and steps S202-S220. In FIG. 15, loop points S202 and S220 indicate that a sequence of steps between them should be executed for the coded bitstream S(0), S(1), or S(2) of interest. Furthermore, loop points S203 and S206 indicate that a sequence of steps between them should be executed for each of slices constituting one access unit. In addition, loop points S209 and S218 indicate that a sequence of steps between them should be executed for each of slices constituting one access unit. Furthermore, loop points S210 and S217 indicate that a sequence of steps between them should be executed for each of blocks constituting one slice.

As shown in FIG. 15, the step S201 in the segment of the control program for the CPU 20B decodes the coded bitstream inclusive of SPS, PPS, and SEI, thereby recovering the parameters about the whole of the video sequences, the parameters about pictures, and the parameters about the supplemental enhancement information.

In the case where the encoding apparatus combines the view dependency counts for the respective viewpoints in a set before encoding the set as a parameter about the whole of the video sequences, the step S201 recovers the view dependency counts according to the syntax structure in FIG. 5.

The step S201 is followed by a step for starting the control programs for the processors PR(0), PR(1), and PR(2). These control programs are designed to control the processors PR(0), PR(1), and PR(2) to decode the coded bitstreams S(0), S(1), and S(2) into the decoded video sequences M(0)A, M(1)A, and M(2)A in real time on a parallel processing basis.

After the step S201 in the control program for the CPU 20B is executed, each of the control programs for the processors PR(0), PR(1), and PR(2) reaches a step S204 through the loop points S202 and S203. The step S204 decodes specified data in the related coded bitstream S(0), S(1), or S(2). The specified data represents parameters about slices constituting a picture from the present viewpoint and encoded as a header of a VCL NAL unit and a slice header prescribed by the MPEG-4 AVC/H.264 standards. Thus, the step S204 recovers the parameters about slices constituting a picture from the present viewpoint. The step S204 does not decode portions of the related coded bitstream S(0), S(1), or S(2) which represent the coding mode, motion vectors, disparity vectors, and DCT coefficients for every multi-pixel block.

In the case where the encoding apparatus encodes the view dependency counts individually and separately on a viewpoint-by-viewpoint basis, the step S204 decodes the coded version of the related view dependency count as one of parameters about slices constituting a picture from the present viewpoint. Thus, in this case, the step S204 recovers the value of the view dependency count for the present viewpoint.

A step S205 following the step S204 stores the non-decoded portions of the related coded bitstream S(0), S(1), or S(2) in the related coded bitstream buffer. The non-decoded portions of the related coded bitstreams S(0), S(1), or S(2) represent the coding mode, motion vectors, disparity vectors, and DCT coefficients for every multi-pixel block.

The steps S204 and 205 between the loop points S203 and S206 are periodically iterated until the data stored in the related coded bitstream buffer corresponds to all slices constituting one access unit. Thereafter, the program advances from the step S205 to a step S207 through the loop point S206. In this case, it is preferable that the loop point S206 increments the value of an access-unit time counter by "1".

The step S207 compares the decoded view dependency count and the value of the access-unit time counter, and decides whether or not a delay is necessary on the basis of the result of the comparison. When a delay is necessary, the program advances from the step S207 to the loop point S220 and then ends. On the other hand, when a delay is not necessary, the program advances from the step S207 to a step S208.

The comparison by the step S207 is to determine whether or not the present moment has reached the end of a desired delay of the start of the decoding of a coded picture of the viewpoint of interest. The present moment is indicated by the value of the access-unit time counter while the desired delay is represented by the decoded view dependency count. When the present moment has reached the end of the desired delay, the program advances from the step S207 to the step S208. Otherwise, the program advances from the step S207 to the step S220.

The step S208 reads out one access unit of the coded bitstream S(0), S(1), or S(2) from the related coded bitstream buffer. The step S208 starts decoding the access unit of the coded bitstream S(0), S(1), or S(2). After the step S209, the program reaches a step S211 through the loop points S209 and S210.

For the current block, the step S211 decodes the related coded bitstream S(0), S(1), or S(2) into the coding-mode signal, the motion vector or vectors, the disparity vector or vectors, and the coded residual signal. The step S203 corresponds to the bitstream decoding section 401 in FIG. 13.

A step S212 following the step S211 selectively performs the motion-compensated prediction from a reference picture or pictures in response to the coding-mode signal and the motion vector or vectors, and thereby generates a motion-compensated prediction block (a motion-compensated prediction signal). The step S212 selectively performs the disparity-compensated prediction from an other-viewpoint reference picture or pictures in response to the coding-mode signal and the disparity vector or vectors, and thereby generates a disparity-compensated prediction block (a disparity-compensated prediction signal). The step S212 corresponds to the motion/disparity-compensated predicting section 402 in FIG. 13.

A step S213 subsequent to the step S212 generates a final prediction signal from at least one of the motion-compensated prediction block and the disparity-compensated prediction block in accordance with the coding-mode signal. The step S213 corresponds to the prediction-signal generating section 403 in FIG. 13.

A step S214 following the step S213 decodes the coded residual signal into the decoded residual signal through the signal processing inclusive of the inverse quantization and the inverse orthogonal transform. The step S214 corresponds to the residual-signal decoding section 404 in FIG. 13.

A step S215 subsequent to the step S214 superimposes the decoded residual signal on the final prediction signal to generate a decoded picture signal. The step S215 corresponds to the adder 405 in FIG. 13

A step S216 following the step S215 stores the decoded picture signal into the related decoded picture buffer. After the step S216, the program reaches a step S219 through the loop points S217 and S218.

The step S219 sequentially outputs picture-corresponding segments (pictures) of the decoded picture signal from the decoded picture buffer in the display timing order. The program advances from the step S219 to the loop point S220, and then ends.

After the control programs for the processors PR(0), PR(1), and PR(2) end, the control program for the CPU 20B also ends.

Fifth Embodiment

Figure 16:
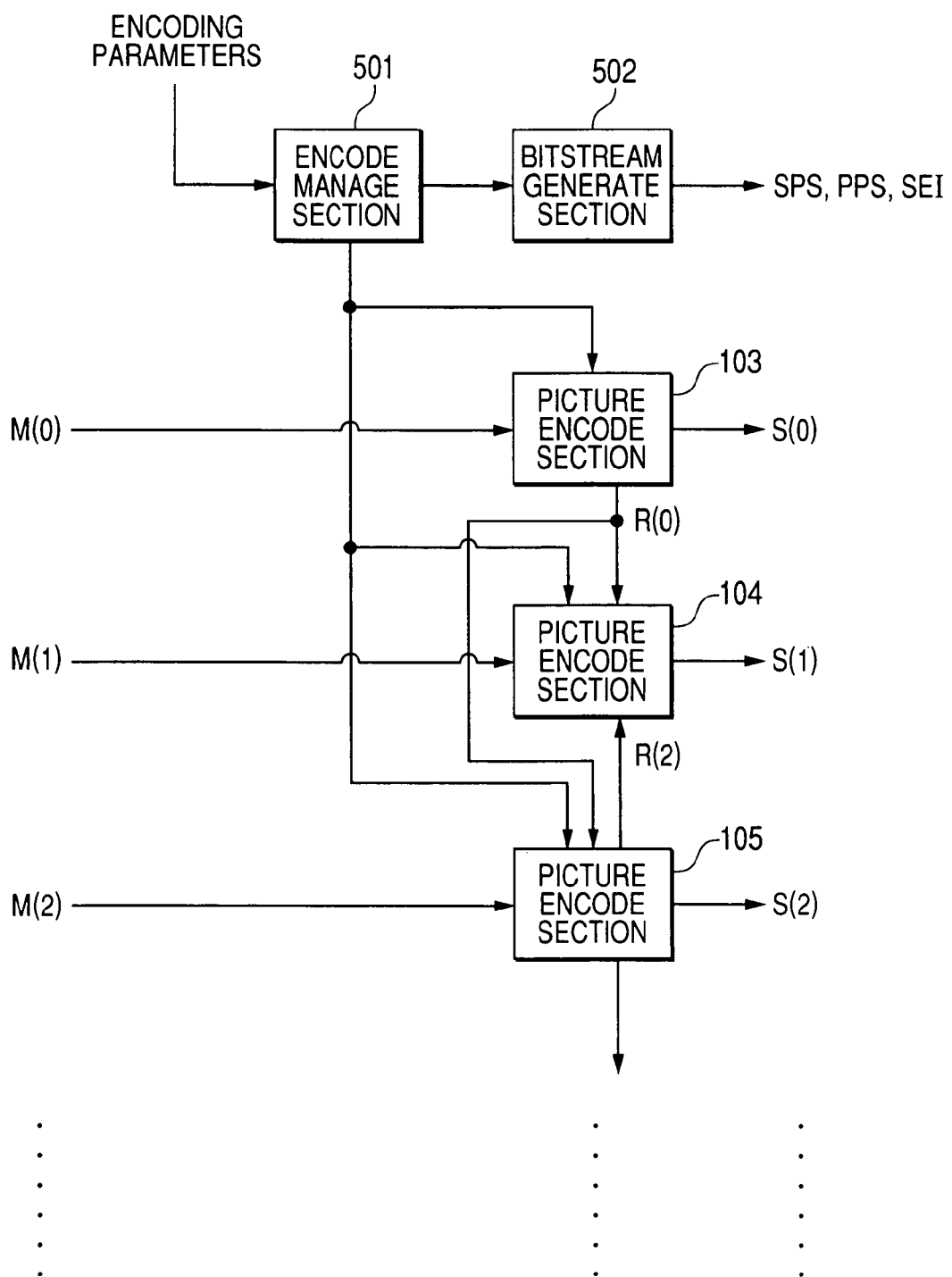
FIG. 16 is a block diagram of a multi-view video encoding apparatus according to a fifth embodiment of this invention.

FIG. 16 shows a multi-view video encoding apparatus according to a fifth embodiment of this invention. The encoding apparatus of FIG. 16 is similar to that of FIG. 1 except that an encoding management section 501 and a coded bitstream generating section 502 replace the encoding management section 101 and the coded bitstream generating section 102 (see FIG. 1) respectively.

The encoding management section 501 performs encoding-related management in accordance with encoding parameters set from an external. The encoding-related management utilizes information (parameters) about the whole of the video sequences, information (parameters) about pictures, and information (parameters) about slices constituting each picture. Furthermore, the encoding management section 501 performs the management of the picture encoding order for each video sequence M(v) and the management of view dependencies (reference dependencies) among pictures in the video sequences M(v). Basically, the encoding management section 501 is similar in operation to the encoding management section 101 in FIG. 1.

The encoding management section 501 feeds the coded bitstream generating section 502 with the parameters about the whole of the video sequences, the parameters about pictures, and the parameters about supplemental enhancement information. On the other hand, the encoding management section 501 does not feed the view dependency counts to the bitstream generating section 502. Thus, the view dependency counts are neither encoded nor sent toward a decoding side.

The encoding management section 501 feeds information about the view dependencies (the reference dependencies) among pictures in the video sequences M(v) to the coded bitstream generating section 502. The encoding management section 501 notifies the number of the viewpoints to the coded bitstream generating section 502.

The coded bitstream generating section 502 encodes the parameters about the whole of the video sequences, the parameters about pictures, the parameters about supplemental enhancement information, the view dependencies, and the number of viewpoints into a coded bitstream representative of an SPS (sequence parameter set), a PPS (picture parameter set), and SEI (supplemental enhancement information) prescribed by the MPEG-4 AVC/H.264 standards. The parameters about the whole of the video sequences, the view dependencies, and the number of viewpoints are assigned to the SPS. The parameters about pictures are assigned to the PPS. The parameters about supplemental enhancement information are assigned to the SEI. The coded bitstream generating section 502 sends the coded bitstream inclusive of SPS, PPS, and SEI to the decoding side.

The decoding side decodes the coded bitstream inclusive of SPS, PPS, and SEI to recover the parameters about the whole of the video sequences, the parameters about pictures, the parameters about supplemental enhancement information, the view dependencies, and the number of viewpoints. The decoding side calculates the view dependency counts for the respective viewpoints from the recovered view dependencies and the recovered number of viewpoints.

The number of viewpoints and the view dependencies are encoded as information about the whole of the video sequences in, for example, a way disclosed in "Joint Draft 1.0 on Multiview Video Coding, Joint Video Team of ISO/IEC MPEG & ITU-T VCEG, JVT-U209, November 2006". For the encoding of the number of viewpoints and the view dependencies, this encoding way utilizes a syntax structure shown in FIG. 17.

With reference to FIG. 17, "seq_parameter_set_mvc_extension" is contained in an SPS prescribed by the MPEG-4 AVC/H.264 standards. Syntax elements representing parameters are as follows. There is "num_views_minus1" indicating a parameter for encoding the number of viewpoints from which the multi-view video is taken. The value of "num_views_minus1" is equal to the number of viewpoints minus 1. There is "num_anchor_refs_l0[i]" indicating the number of disparity-compensated prediction references for reference picture list 0 for anchor pictures with viewpoint ID equal to "i". Here, the anchor picture means a picture of a first time point which can be decoded without referring to another picture of a second time point different from the first time point as a reference picture. The decoding of an anchor picture of a time point and a first viewpoint can refer to only an anchor picture of the same time point and a second viewpoint different from the first viewpoint as a reference picture. Accordingly, the encoding of an anchor picture can not use motion-compensated prediction. For example, the pictures P(0, 0), P(1, 0), P(2, 0), P(0, 4), P(1, 4), and P(2, 4) in FIG. 2 are anchor pictures. Regarding inter-picture prediction (motion-compensated prediction or disparity-compensated prediction) for a P slice or a B slice, a reference picture list is used for designating which of candidate reference pictures is actually referred to as a reference picture. There are reference picture lists 0 and 1. For a P slice, inter-picture prediction can be implemented through the use of only the reference picture list 0. For a B slice, inter-picture prediction can be implemented through the use of both the reference picture lists 0 and 1.

In FIG. 17, "anchor_ref_l0[i][j]" indicates the ID of a viewpoint that is used as the j-th reference of reference picture list 0 for anchor pictures of the viewpoint with viewpoint ID equal to "i". There is "num_anchor_refs_l1[i]" specifying the number of disparity-compensated prediction references for reference picture list 1 for anchor pictures with viewpoint ID equal to "i". There is "anchor_ref_l1[i][j]" indicating the ID of a viewpoint that is used as the j-th reference of reference picture list 1 for anchor pictures of the viewpoint with viewpoint ID equal to "i". There is "num_non_anchor_refs_l0[i]" indicating the number of disparity-compensated prediction references for reference picture list 0 for non-anchor pictures with viewpoint ID equal to "i". Here, non-anchor pictures are pictures except anchor pictures. The encoding and decoding of a non-anchor picture of a first time point can refer to a picture of a second time point different from the first time point as a reference picture. Thus, the encoding and decoding of a non-anchor picture can use motion-compensated prediction. For example, the pictures P(0, 1), P(1, 1), P(2, 1), P(0, 2), P(1, 2), and P(2, 2) in FIG. 2 are non-anchor pictures.

In FIG. 17, "non_anchor_ref_l0[i][j]" indicates the ID of a viewpoint that is used as the j-th reference of reference picture list 0 for non-anchor pictures of the viewpoint with viewpoint ID equal to "i". There is "num_non_anchor_refs_l1[i]" specifying the number of disparity-compensated prediction references for reference picture list 1 for non-anchor pictures with viewpoint ID equal to "i". There is "non_anchor_ref_l1[i][j]" indicating the ID of a viewpoint that is used as the j-th reference of reference picture list 1 for non-anchor pictures with the viewpoint with viewpoint ID equal to "i". Each syntax element is encoded into a form without a sign according to an exponential Golomb coding scheme. The exponential Golomb coding is one type of universal coding. Thus, the exponential Golomb coding is variable length coding without using a conversion table.

In the case where the view sequences are encoded with motion-compensated prediction and disparity-compensated prediction under conditions of FIG. 2 according to the syntax structure of FIG. 17, syntax elements take values as shown in FIG. 18.

An encoding side encodes the previously-indicated parameters before sending the coded version of the parameters to a decoding side. The decoding side decodes the coded parameters. When decoding a coded picture from a certain viewpoint, the decoding side can decide which of pictures from viewpoints should be referred to as a reference picture on the basis of the decoded parameters. The decoding side may calculate view dependency counts from the decoded parameters.

With reference back to FIG. 16, the coded bitstream generating section 502 receives, from the encoding management section 501, the parameters about the whole of the video sequences, the parameters about pictures, the parameters about the supplemental enhancement information, the view dependencies (the reference dependencies) among pictures in the video sequences M(v), and the number of the viewpoints. The coded bitstream generating section 502 encodes the parameters about the whole of the video sequences, the parameters about pictures, the parameters about supplemental enhancement information, the view dependencies, and the number of viewpoints into a coded bitstream representative of an SPS (sequence parameter set), a PPS (picture parameter set), and SEI (supplemental enhancement information) prescribed by the MPEG-4 AVC/H.264 standards. The parameters about the whole of the video sequences, the view dependencies, and the number of viewpoints are assigned to the SPS. The encoding of the view dependencies is implemented according to the syntax structure in FIG. 17. The parameters about pictures are assigned to the PPS. The parameters about supplemental enhancement information are assigned to the SEI. The coded bitstream generating section 502 sends the coded bitstream inclusive of SPS, PPS, and SEI to the decoding side. The decoding side decodes the coded view dependencies and the coded number of viewpoints before calculating view dependency counts from the decoded view dependencies and the decoded number of viewpoints.

The bitstream generating section 502 does not encode the view dependency counts. Therefore, the bitstream generating section 502 does not transmit the view dependency counts to the decoding side.

As previously mentioned, the number of viewpoints and the view dependencies (the reference dependencies) are encoded before being transmitted to the decoding side. The decoding side decodes the coded number of viewpoints and the coded view dependencies. The decoding side computes the view dependency counts for the respective viewpoints from the decoded number of viewpoints and the decoded view dependencies. As previously mentioned, the coded bitstreams of the respective viewpoints are transmitted to the decoding side. For example, the decoding side decodes the coded bitstreams in real time on a parallel processing basis. The decoding side derives desired delays of the start of decoding the coded bitstreams from the computed view dependency counts. The decoding side starts decoding the coded bitstreams at timings accorded with the desired delays so that the picture-based synchronization among the coded bitstreams can be acquired. Therefore, the decoding of a coded picture of a viewpoint to generate a reference picture is surely completed before the start of the decoding of a coded picture of another viewpoint which uses the reference picture in disparity-compensated prediction.

Sixth Embodiment

Figure 19:
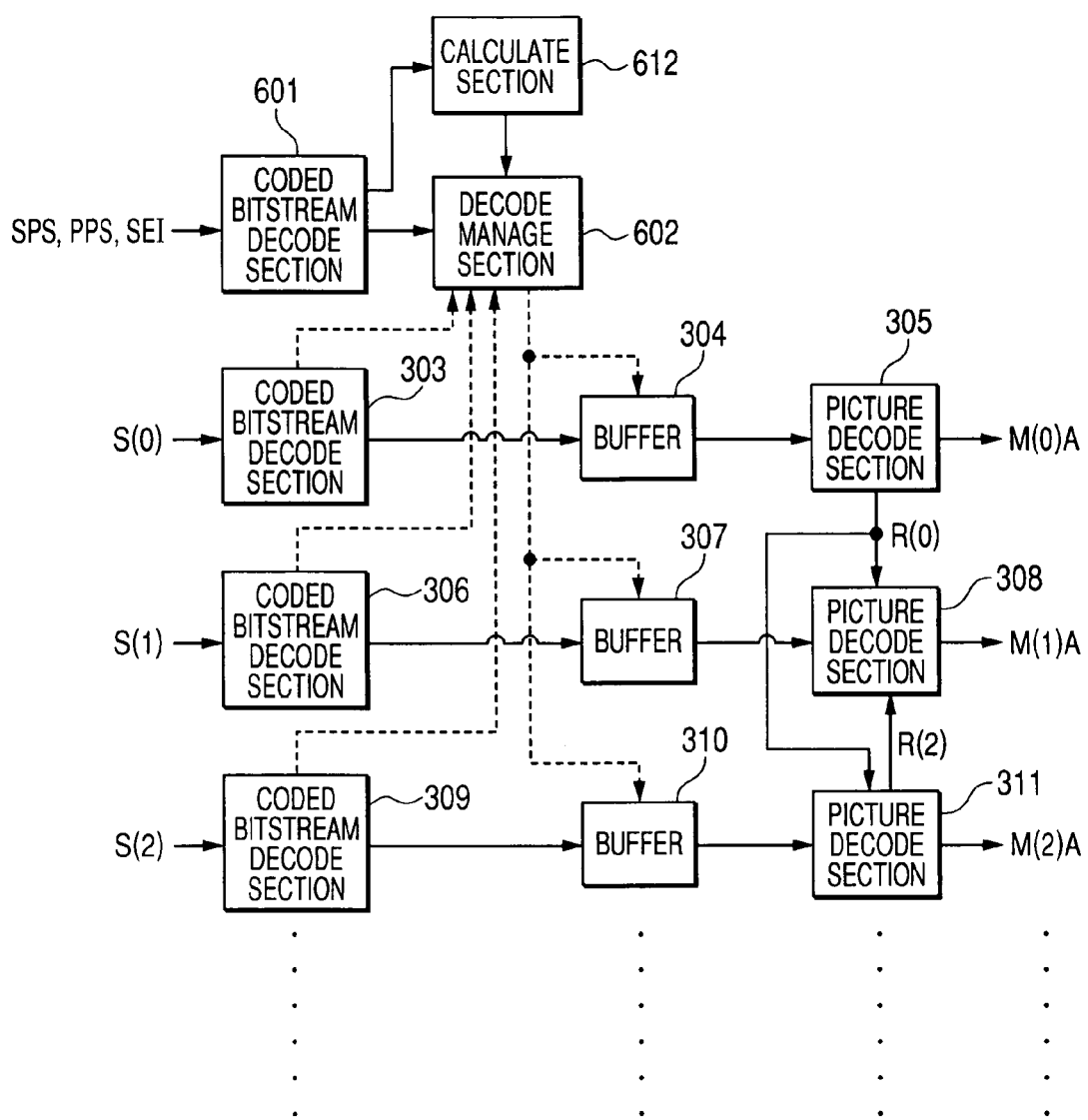
FIG. 19 is a block diagram of a multi-view video decoding apparatus according to a sixth embodiment of this invention.

FIG. 19 shows a multi-view video decoding apparatus according to a sixth embodiment of this invention. The decoding apparatus of FIG. 19 is similar to that of FIG. 12 except for design changes mentioned hereafter.

The decoding apparatus of FIG. 19 receives the coded bitstream inclusive of SPS, PPS, and SEI, and the different-viewpoint coded bitstreams S(v) from the encoding apparatus of FIG. 16, where "v" denotes an ID for each viewpoint, and v=0, 1, 2, . . . . The decoding apparatus decodes the coded bitstream inclusive of SPS, PPS, and SEI. Furthermore, the decoding apparatus decodes the different-viewpoint coded bitstreams S(v) into different-viewpoint decoded video sequences M(v)A.

The decoding apparatus of FIG. 19 includes a coded-bitstream decoding section 601 and a decoding management section 602 instead of the coded-bitstream decoding section 301 and the decoding management section 302 (see FIG. 12) respectively. The decoding apparatus of FIG. 19 further includes a calculating section 612 provided between the coded-bitstream decoding section 601 and the decoding management section 602.

The coded-bitstream decoding section 601 decodes the coded bitstream inclusive of SPS, PPS, and SEI, and thereby recovers the parameters about the whole of the view sequences, the parameters about pictures, the parameters about supplemental enhancement information, the number of the viewpoints, and the view dependencies. The coded-bitstream decoding section 601 obtains information about the number of viewpoints in the bitstream from "num_views_minus1". It should be noted that the value of "num_views_minus1" is equal to the number of viewpoints minus 1. The coded-bitstream decoding section 601 obtains information about the view dependencies from "num_anchor_refs_10[i]", "anchor_ref_10[i][j]", "num_anchor_refs_11[i]", "anchor_ref_11[i][j]", "num_non_anchor_refs_10[i]", "non_anchor_ref_10[i][j]", "num_non_anchor_refs_11 [i]", and "non_anchor_ref_11 [i][j]".

The coded-bitstream decoding section 601 feeds the decoding management section 602 with the parameters about the whole of the view sequences, the parameters about pictures, and the parameters about supplemental enhancement information. The coded-bitstream decoding section 601 feeds the calculating section 612 with the information about the number of viewpoints and the information about the view dependencies.

The calculating section 612 detects a base viewpoint among the viewpoints from the number of viewpoints and the view dependencies notified by the coded-bitstream decoding section 601. Here, a base viewpoint means a viewpoint corresponding to pictures encoded without referring to decoded pictures in the other viewpoints for the disparity-compensated prediction. The calculating section 612 computes view dependency counts for the respective viewpoints from the number of viewpoints, the view dependencies, and the detected base viewpoint. It should be noted that each of the view dependency counts for the non-base viewpoints represents a desired delay of the decoding of coded pictures of the present non-base viewpoint relative to the decoding of coded pictures of the base viewpoint.

A view dependency count for a viewpoint having an ID of "i" is denoted by "view_dependency_count[i]", where i=0, 1, 2, . . . , Imax (equal to the number of viewpoints minus 1). In the case where the encoding of a picture from a first viewpoint refers to a picture from a second viewpoint different from the first viewpoint as a reference picture for disparity-compensated prediction, the second viewpoint is called a disparity-compensation reference viewpoint. The number of disparity-compensation reference viewpoints is denoted by "num_ref_views[i]", where "i" indicates a viewpoint ID and i=0, 1, 2, . . . , Imax (equal to the number of viewpoints minus 1). A disparity-compensation reference ID is denoted by "ref_view_id[i][k]", where "i" indicates a viewpoint ID and i=0, 1, 2, . . . , Imax (equal to the number of viewpoints minus 1), and "k" identifies each of disparity-compensation reference viewpoints for the viewpoint of interest and k=0, 1, 2, . . . , Kmax (equal to the value of "num_ref_views[i]" minus 1).

For each of the viewpoints, the calculating section 612 computes the number of disparity-compensation reference viewpoints and the IDs of the disparity-compensation reference viewpoints. Specifically, for each of the viewpoints, the parameters "anchor_ref_10[i][j]", "anchor_ref_11[i][j]", "non_anchor_ref_10[i][j]", and "non_anchor_ref_11[i][j]" indicate the IDs of viewpoints corresponding to pictures which are referred to as reference pictures for motion-compensated prediction and disparity-compensated prediction. The calculating section 612 derives the IDs of the disparity-compensation reference viewpoints from these parameters.

In the case where the syntax elements take values of FIG. 18, the IDs of disparity-compensation reference viewpoints and the number of the disparity-compensation reference viewpoints for each of the viewpoints are equal to those in FIG. 20.

With reference to FIGS. 18 and 20, regarding the viewpoint 0, "non_anchor_ref_10[0][0]", "non_anchor_ref_10[0][1]", "non_anchor_ref_11[0][0]", and "non_anchor_ref_11[0][1]" are "0". Thus, the encoding of pictures from the viewpoint 0 refers to pictures from only the viewpoint 0 as reference pictures for prediction. Accordingly, the calculating section 612 concludes the viewpoint 0 to be a base viewpoint. It should be noted that a base viewpoint means a viewpoint corresponding to pictures encoded without referring to decoded pictures in the other viewpoints for the disparity-compensated prediction. Therefore, regarding the viewpoint 0, the number of disparity-compensation reference viewpoints is "0". As mentioned above, the calculating section 612 detects a base viewpoint (the viewpoint 0) among the viewpoints from the information about the number of the viewpoints and the information about the view dependencies.

Regarding the viewpoint 1, "anchor_ref_10 [1][0]", "anchor_ref_11[1][1]", and "non_anchor_ref_10 [1][1]" are "0", and "anchor_ref_10[1][1]", "anchor_ref_11[1][0]", and "non_anchor_ref_11[1][1]" are "2" while "non_anchor_ref_10[1][0]" and "non_anchor_ref_11[1][0]" are "1". For the viewpoint 1, the calculating section 612 derives the IDs of disparity-compensation reference viewpoints from these parameters. Since the parameters are equal to the above values, the calculating section 612 concludes that the number of disparity-compensation reference viewpoints is "2", and the IDs of disparity-compensation reference viewpoints are "0" and "2" ("num_ref_views[1]" is "2" and "ref_view_id[1][0]" is "0", and "ref_view_id[1][1]" is "2"). Furthermore, the calculating section 612 concludes the viewpoint 1 to be different from a base viewpoint.

Regarding each of the viewpoints 2-7, the calculating section 612 computes the number of disparity-compensation reference viewpoints and the IDs of the disparity-compensation reference viewpoints, and decides whether or not the present viewpoint is a base viewpoint in a way similar to the above one.

The calculating section 612 sets a view dependency count for a base viewpoint to "0". In FIG. 20, regarding only the viewpoint 0, the number of disparity-compensation reference viewpoints is "0". Thus, the viewpoint 0 is a base viewpoint. Accordingly, the view dependency count for the viewpoint 0 is set to "0" (only "view_dependency_count[0]" is "0"). Then, the calculating section 612 computes the view dependency counts for the respective viewpoints except the base viewpoint.

The computation of the view dependency counts is as follows. First, the calculating section 612 initializes an index "i" to "0". The index "i" denotes the ID of each viewpoint. Then, the calculating section 612 decides whether or not the view dependency count "view_dependency_count[i]" for the present viewpoint has already been computed.

When the view dependency count "view_dependency_count[i]" for the present viewpoint has already been computed, the calculating section 612 increments the index "i" by "1".

On the other hand, in the case where the view dependency count "view_dependency_count[i]" for the present viewpoint has not been computed yet, the calculating section 612 implements the following operation steps. First, the calculating section 612 initializes an index "k" to "0". The index "k" identifies each of disparity-compensation reference viewpoints for the present viewpoint. Second, the calculating section 612 decides whether or not the view dependency count "view_dependency_count[ref_view_id[i][k]]" for the instant disparity-compensation reference viewpoint with respect to the present viewpoint has already been computed. When the view dependency count "view_dependency_count[ref_view_id[i][k]]" has not been computed yet, the calculating section 612 concludes that the computation of the view dependency counts for all the disparity-compensation reference viewpoints with respect to the present viewpoint has not been completed yet. On the other hand, when the view dependency count "view_dependency_count[ref_view_id[i][k]]" has already been computed, the calculating section 612 increments the index "k" by "1". Then, the calculating section 612 compares the index "k" and the number of disparity-compensation reference pictures for the present viewpoint ("num_ref_views[i]"). When the index "k" is equal to or greater than the reference picture number "num_ref_views[i]", the calculating section 612 concludes that the computation of the view dependency counts for all the disparity-compensation reference viewpoints with respect to the present viewpoint has been completed. Otherwise, the calculating section 612 repeats the decision as to whether or not the view dependency count "view_dependency_count[ref_view_id[i][k]]" has already been computed, and the subsequent operation steps.

After concluding that the computation of the view dependency counts for all the disparity-compensation reference viewpoints with respect to the present viewpoint has not been completed yet, the calculating section 612 increments the index "k" by "1".

On the other hand, after concluding that the computation of the view dependency counts for all the disparity-compensation reference viewpoints with respect to the present viewpoint has been completed, the calculating section 612 implements the following operation steps. First, the calculating section 612 tentatively sets the view dependency count "view_dependency_count[i]" for the present viewpoint to "1". Second, the calculating section 612 initializes the index "k" to "0". Third, the calculating section 612 compares the view dependency count "view_dependency_count[i]" for the present viewpoint and the view dependency count "view_dependency_count[ref_view_id[i][k]]" for the instant disparity-compensation reference viewpoint with respect to the present viewpoint. When the view dependency count "view_dependency_count[i]" is equal to or smaller than the view dependency count "view_dependency_count[ref_view_id[i][k]], the calculating section 612 sets the view dependency count "view_dependency_count[i]" equal to the view dependency count "view_dependency_count[ref_view_id[i][k]] plus "1". Then, the calculating section 612 increments the index "k" by "1". On the other hand, when the view dependency count "view_dependency count[i]" is greater than the view dependency count "view_dependency_count[ref_view_id[i][k]], the calculating section 612 increments the index "k" by "1". After incrementing the index "k" by "1", the calculating section compares the index "k" and the number of disparity-compensation reference pictures for the present viewpoint ("num_ref_views[i]"). When the index "k" is equal to or greater than the reference picture number "num_ref_views[i]", the calculating section 612 implements a next operation step. Otherwise, the calculating section 612 repeats the comparison between the view dependency count "view_dependency_count[i]" and the view dependency count "view_dependency_count[ref_view_id[i][k]], and the subsequent operation steps. Then, the calculating section 612 increments the index "i" by "1".

After incrementing the index "i" by "1", the calculating section 612 compares the index "i" and the number of viewpoints minus 1 ("num_views_minus1"). In the case where the index "i" is greater than the number of viewpoints minus 1 "num_views_minus 1", the calculating section 612 decides whether or not the computation of the view dependency counts for all the viewpoints has been completed. When the computation of the view dependency counts has been completed, the calculating section 612 terminates the signal processing to compute the view dependency counts for the respective viewpoints with respect to the present viewpoint. Otherwise, the calculating section 612 repeats initializing the index "i" to "0" and the subsequent operation steps. On the other hand, in the case where the index "i" is equal to or smaller than the number of viewpoints minus 1 "num_views_minus1", the calculating section 612 repeats the decision as to whether or not the view dependency count "view_dependency_count[i]" for the present viewpoint has already been computed, and the subsequent operation steps.

In this way, the calculating section 612 decides whether or not each of the viewpoints is a base viewpoint. Furthermore, the calculating section 612 sets the view dependency count for the base viewpoint to "0", and computes the view dependency counts for the respective viewpoints except the base viewpoint. The calculating section 612 feeds the decoding management section 602 with information representing whether or not each of the viewpoints is a base viewpoint, and information representing the view dependency counts for the respective viewpoints. The decoding management section 602 operates in response to the view dependency counts for the respective viewpoints as the decoding management section 302 in FIG. 12 does. Operation of a combination of the decoding management section 602, the coded-bitstream decoding sections 301, 303, 306, and 309, the buffers 304, 307, and 310, and the picture decoding sections 305, 308, and 311 in FIG. 19 is similar to that of a combination of the decoding management section 302, the coded-bitstream decoding sections 301, 303, 306, and 309, the buffers 304, 307, and 310, and the picture decoding sections 305, 308, and 311 in FIG. 12.

The calculating section 612 may not feed the decoding management section 602 with information representing whether or not each of the viewpoints is a base viewpoint. In this case, the decoding management section 602 checks whether or not each of the view dependency counts for the respective viewpoints is "0". Then, the decoding management section 602 decides that a viewpoint corresponding to a view dependency count of "0" is a base viewpoint, and that each viewpoint corresponding to a view dependency count different from "0" is not a base viewpoint.

As previously mentioned, the encoding apparatus encodes the number of the viewpoints and the view dependencies (the reference dependencies) before transmitting the coded version thereof to the decoding apparatus. The decoding apparatus decodes the coded number of viewpoints and the coded view dependencies. The decoding apparatus computes the view dependency counts for the respective viewpoints from the decoded number of viewpoints and the decoded view dependencies. The encoding apparatus transmits the coded bitstreams of the respective viewpoints to the decoding apparatus. The decoding apparatus decodes the coded bitstreams in real time on a parallel processing basis. The decoding apparatus derives desired delays of the start of decoding the coded bitstreams from the computed view dependency counts. The decoding apparatus starts decoding the coded bitstreams at timings accorded with the desired delays so that the picture-based synchronization among the coded bitstreams can be acquired. Therefore, the decoding of a coded picture of a viewpoint to generate a reference picture is surely completed before the start of the decoding of a coded picture of another viewpoint which uses the reference picture in disparity-compensated prediction.

Seventh Embodiment

A multi-view video decoding apparatus in a seventh embodiment of this invention is similar to that of FIG. 14 except for design changes mentioned hereafter. The decoding apparatus in the seventh embodiment of this invention is similar in operation to that of FIG. 19.

Figure 21:
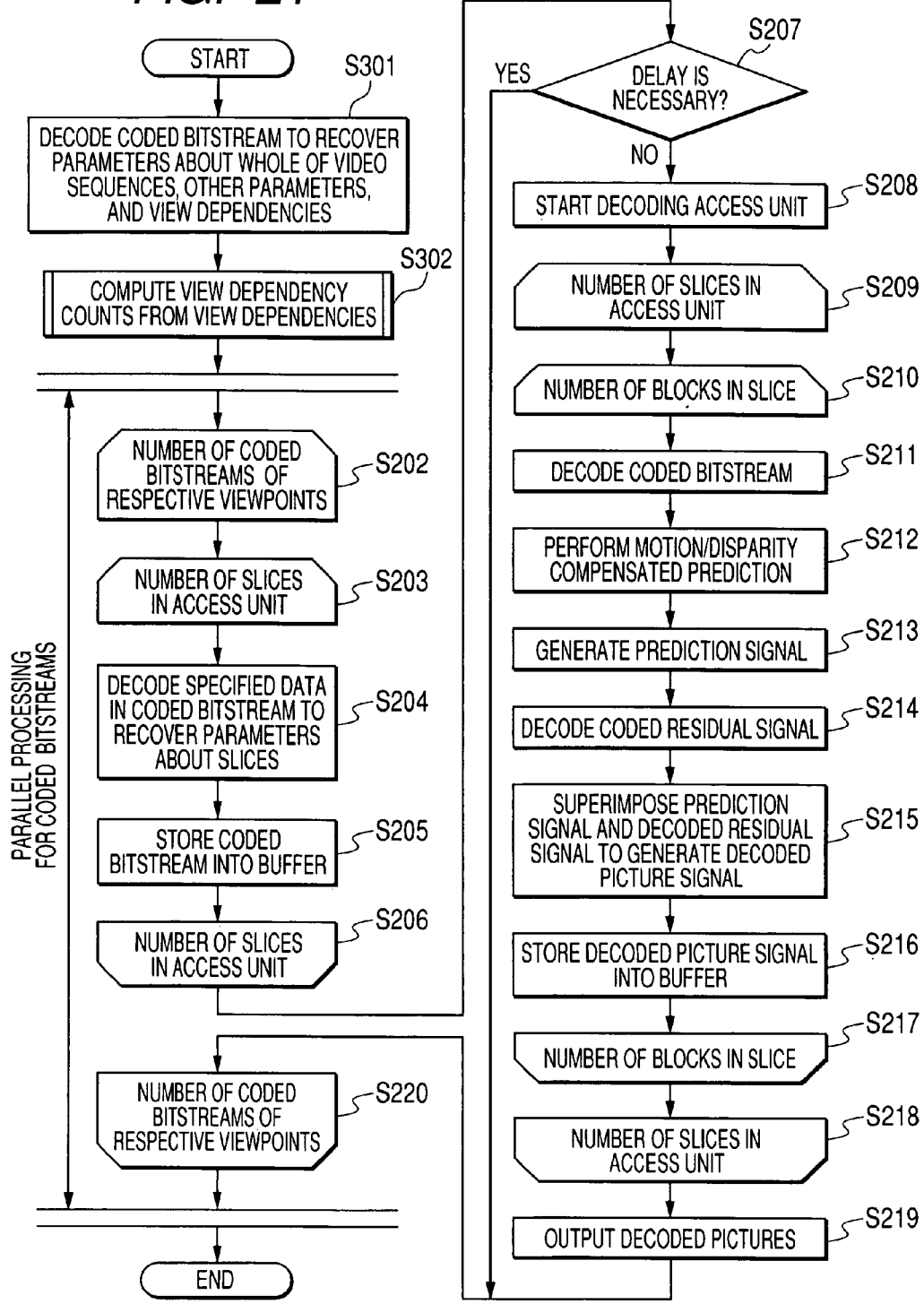
FIG. 21 is a flowchart of control programs for a CPU and a processor in a multi-view video decoding apparatus according to a seventh embodiment of this invention.

FIG. 21 is a flowchart of a segment of the control program for the CPU 20B and a segment of the control program for each of the processors PR(0), PR(1), and PR(2) in the decoding apparatus of the seventh embodiment of this invention. The flowchart in FIG. 21 is a modification of the flowchart in FIG. 15.

With reference to FIG. 21, the segment of the control program for the CPU 20B has steps S301 and S302. The segment of the control program for each of the processors PR(0), PR(1), and PR(2) is similar to that in FIG. 15, and has the loop points and the steps S202-S220.

As shown in FIG. 21, the step S301 in the segment of the control program for the CPU 20B decodes the coded bitstream inclusive of SPS, PPS, and SEI, thereby recovering the parameters about the whole of the video sequences, the parameters about pictures, the parameters about supplemental enhancement information, the number of the viewpoints, and the view dependencies (the reference dependencies).

The step S302 follows the step S301. The step S302 detects a base viewpoint among the viewpoints from the number of viewpoints and the view dependencies obtained by the step S301. The step S302 computes the view dependency counts for the respective viewpoints from the number of viewpoints, the view dependencies, and the detected base viewpoint.

The step S302 is followed by a step for starting the control programs for the processors PR(0), PR(1), and PR(2). These control programs are designed to control the processors PR(0), PR(1), and PR(2) to decode the coded bitstreams S(0), S(1), and S(2) into the decoded video sequences M(0)A, M(1)A, and M(2)A in real time on a parallel processing basis. After the step S302 in the control program for the CPU 20B is executed, each of the control programs for the processors PR(0), PR(1), and PR(2) reaches a step S204 through the loop points S202 and S203. The view dependency counts for the respective viewpoints which are computed by the step S302 are used by the control programs for the processors PR(0), PR(1), and PR(2).

Figure 22:
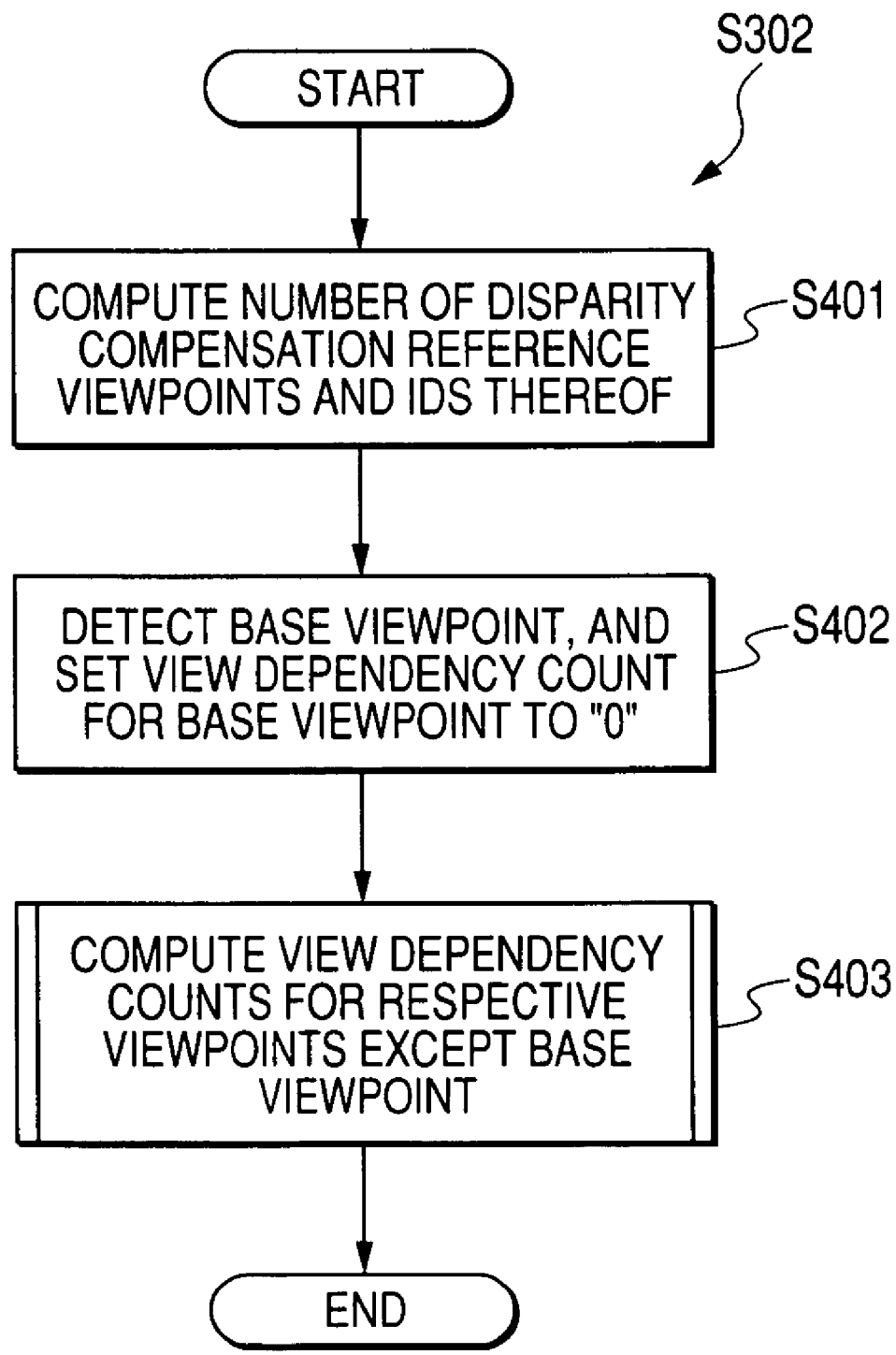
FIG. 22 is a flowchart showing the details of a step in FIG. 21.

As shown in FIG. 22, the step S302 has a sequence of steps S401, S402, and S403. For each of the viewpoints, the step S401 computes the number of disparity-compensation reference viewpoints and the IDs of the disparity-compensation reference viewpoints. Specifically, for each of the viewpoints, the parameters "anchor_ref_10[i][j]", "anchor_ref_11[i][j]", "non_anchor_ref_10[i][j]", and "non_anchor_ref_11[i][j]" indicate the IDs of viewpoints corresponding to pictures which are referred to as reference pictures for motion-compensated prediction and disparity-compensated prediction. The step S401 derives the IDs of the disparity-compensation reference viewpoints from these parameters. The step S401 counts the derived IDs to detect the number of the disparity-compensation reference viewpoints.

The step S402 following the step S401 detects, among the viewpoints, one for which the number of the disparity-compensation reference viewpoints is "0". The step S402 labels the detected viewpoint as the base viewpoint. The step S402 sets the view dependency count for the base viewpoint to "0".

The step S403 subsequent to the step S402 computes the view dependency counts for the respective viewpoints except the base viewpoint.

Figure 23:
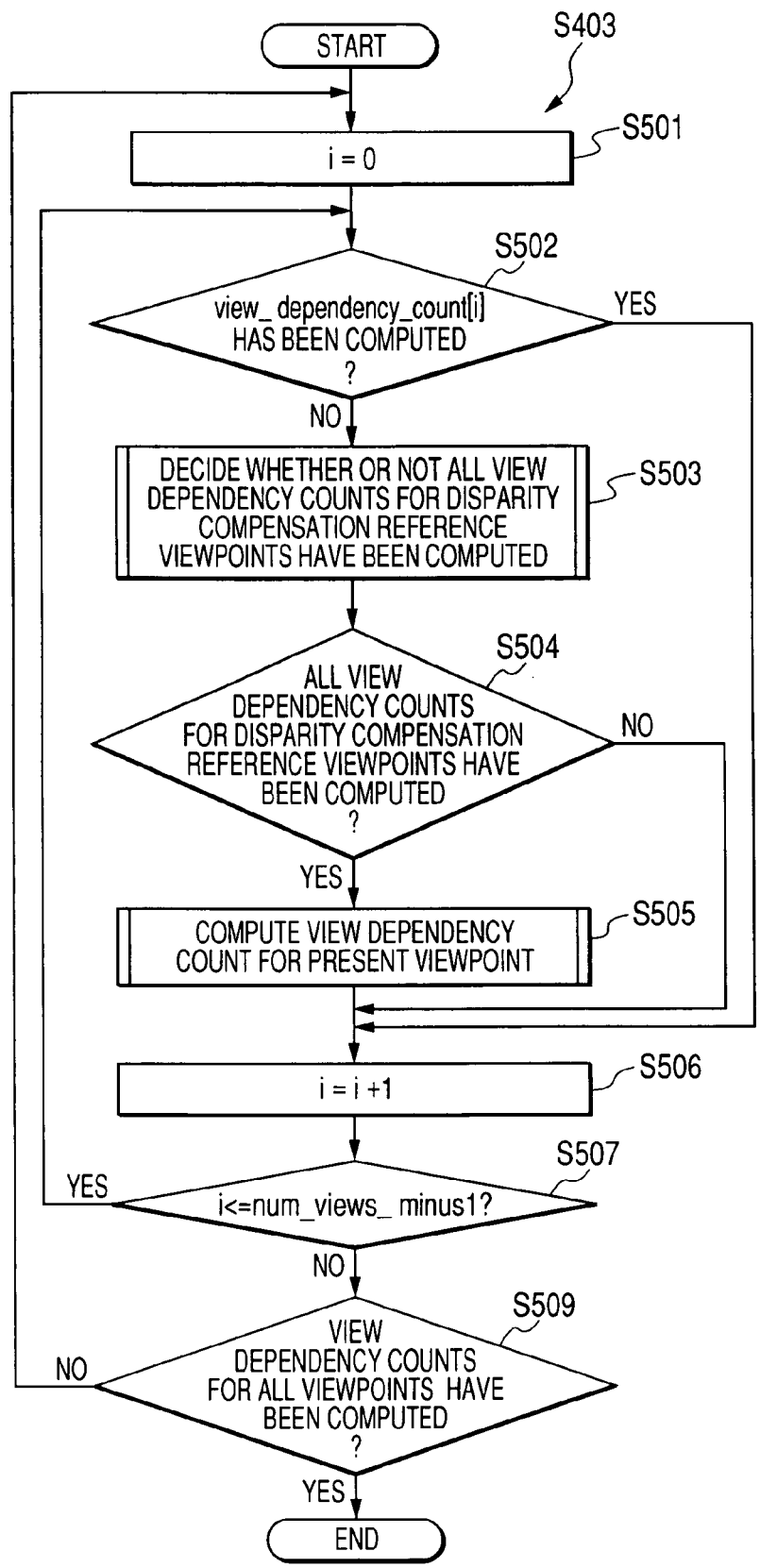
FIG. 23 is a flowchart showing the details of a step in FIG. 22.

As shown in FIG. 23, the step S403 includes steps starting from a step S501. The step S501 initializes an index "i" to "0". The index "i" denotes the ID of each viewpoint. After the step S501, the program advances to a step S502.

The step S502 decides whether or not the view dependency count "view_dependency_count[i]" for the present viewpoint has already been computed. When the view dependency count "view_dependency_count[i]" has already been computed, the program advances from the step S502 to a step S506. Otherwise, the program advances from the step S502 to a step S503.

As shown in FIG. 24, the step S503 includes steps starting from a step S601. The step S601 initializes an index "k" to "0". The index "k" identifies each of disparity-compensation reference viewpoints for the present viewpoint. After the step S601, the program advances to a step S602.

The step S602 decides whether or not the view dependency count "view_dependency_count[ref_view_id[i][k]]" for the instant disparity-compensation reference viewpoint with respect to the present viewpoint has already been computed. When the view dependency count "view_dependency_count [ref_view_id[i][k]]" has already been computed, the program advances from the step S602 to a step S603. Otherwise, the program advances from the step S602 to a step S606.

The step S606 concludes that the computation of the view dependency counts for all the disparity-compensation reference viewpoints with respect to the present viewpoint has not been completed yet. After the step S606, the program advances to a step S504 in FIG. 23.

The step S603 increments the index "k" by "1". A step S604 following the step S603 compares the index "k" and the number of disparity-compensation reference pictures for the present viewpoint ("num_ref_views[i]"). When the index "k" is equal to or greater than the reference picture number "num_ ref_views[i]", the program advances from the step S604 to a step S605. Otherwise, the program returns from the step S604 to the step S602.

The step S605 concludes that the computation of the view dependency counts for all the disparity-compensation reference viewpoints with respect to the present viewpoint has been completed. After the step S605, the program advances to the step S504 in FIG. 23.

With reference back to FIG. 23, the step S504 checks whether or not the computation of the view dependency counts for all the disparity-compensation reference viewpoints with respect to the present viewpoint has been completed by referring the result of the conclusion by the step S503. When the computation of the view dependency counts has been completed, the program advances from the step S504 to a step S505. Otherwise, the program advances from the step S504 to the step S506.

As shown in FIG. 25, the step S505 includes steps starting from a step S701. The step S701 tentatively sets the view dependency count "view_dependency_count[i]" for the present viewpoint to "1".

A step S702 following the step S701 initializes the index "k" to "0". After the step S702, the program advances to a step S703.

The step S703 compares the view dependency count "view_dependency_count[i]" for the present viewpoint and the view dependency count "view_dependency_count[ref_view_id[i][k]] for the instant disparity-compensation reference viewpoint with respect to the present viewpoint. When the view dependency count "view_dependency_count[i]" is equal to or smaller than the view dependency count "view_dependency_count[ref_view_id[i][k]], the program advances from the step S703 to a step S704. Otherwise, the program advances from the step S703 to a step S705.

The step S704 sets the view dependency count "view_dependency_count[i]" equal to the view dependency count "view_dependency_count[ref_view_id[i] [k]] plus "1". After the step S704, the program advances to the step S705.

The step S705 increments the index "k" by "1". A step S706 following the step S705 compares the index "k" and the number of disparity-compensation reference pictures for the present viewpoint ("num_ref_views[i]"). When the index "k" is equal to or greater than the reference picture number "num_ref_views[i]", the program advances from the step S706 to the step S506 in FIG. 23. Otherwise, the program returns from the step S706 to the step S703.

With reference back to FIG. 23, the step S506 increments the index "i" by "1". A step S507 subsequent to the step S506 compares the index "i" and the number of the viewpoints minus 1 ("num_views_minus1"). When the index "i" is greater than the number of viewpoints minus 1 "num_views_minus1", the program advances from the step S507 to a step S509. Otherwise, the program returns from the step S507 to the step S502.

The step S509 decides whether or not the computation of the view dependency counts for all the viewpoints has been completed. When the computation of the view dependency counts has been completed, the operation of the step S403 ends. Otherwise, the program returns from the step S509 to the step S501.

Eighth Embodiment

An eighth embodiment of this invention is similar to one of the first to seventh embodiments thereof except for the following design change.

The video sequences M(v) include actual and virtual ones. An actual video sequence means a video sequence actually generated by a video camera corresponding to a viewpoint. A virtual video sequence means a video sequence generated by virtually taking pictures from a viewpoint. For example, a virtual video sequence is generated from actual video sequences of different viewpoints through interpolation, or generated from an actual video sequence through conversion.

It should be noted that all the video sequences M(v) may be virtual ones.

Ninth Embodiment

A ninth embodiment of this invention is similar to one of the first to seventh embodiments thereof except that the video sequences M(v) represent pictures generated by computer graphics.

Tenth Embodiment

A tenth embodiment of this invention is similar to the first to seventh embodiments thereof except for design changes mentioned hereafter. The tenth embodiment of this invention relates to one of a transmission system, a storage system, and a receiving system which implement the encoding and decoding of multi-view video.

Eleventh Embodiment

An eleventh embodiment of this invention is similar to one of the second, fourth, and seventh embodiments thereof except for design changes mentioned hereafter. According to the eleventh embodiment of this invention, the computer programs (the control programs for the computer systems 10 and 20) are originally stored in a computer-readable recording medium or mediums. The computer programs are installed on the computer systems 10 and 20 from the recording medium or mediums.

Alternatively, the computer programs may be downloaded into the computer systems 10 and 20 from a server through a wire or wireless communication network. The computer programs may be provided as data transmitted by digital terrestrial broadcasting or digital satellite broadcasting.

What is claimed is:

1. An apparatus for decoding a coded multi-view video signal including coded signals resulting from encoding picture signals corresponding to different viewpoints respectively, wherein at least one among the viewpoints is designated as a base viewpoint, the base viewpoint corresponding to a picture signal which is encoded without referring to at least one picture signal corresponding to one of the viewpoints except the base viewpoint, and wherein the coded multi-view video signal contains coded information representing a desired delay time of the start of decoding a coded signal originating from each of the picture signals corresponding to the viewpoints except the base viewpoint relative to the start of decoding a coded signal originating from the picture signal corresponding to the base viewpoint, the apparatus comprising:

first means for decoding the coded information in the coded multi-view video signal to recover the desired delay times for the coded signals originating from the picture signals corresponding to the viewpoints except the base viewpoint;

second means for decoding the coded signal originating from the picture signal corresponding to the base viewpoint;

third means for decoding the coded signals originating from the picture signals corresponding to the viewpoints except the base viewpoint; and fourth means for delaying the decoding of the coded signals by the third means relative to the decoding of the coded signal by the second means by time intervals equal to the desired delay times recovered by the first means.

2. A method of decoding a coded multi-view video signal including coded signals resulting from encoding picture signals corresponding to different viewpoints respectively, wherein at least one among the viewpoints is designated as a base viewpoint, the base viewpoint corresponding to a picture signal which is encoded without referring to at least one picture signal corresponding to one of the viewpoints except the base viewpoint, and wherein the coded multi-view video signal contains coded information representing a desired delay time of the start of decoding a coded signal originating from each of the picture signals corresponding to the viewpoints except the base viewpoint relative to the start of decoding a coded signal originating from the picture signal corresponding to the base viewpoint, the method comprising the steps of:

decoding the coded information in the coded multi-view video signal to recover the desired delay times for the coded signals originating from the picture signals corresponding to the viewpoints except the base viewpoint;

decoding the coded signal originating from the picture signal corresponding to the base viewpoint;

decoding the coded signals originating from the picture signals corresponding to the viewpoints except the base viewpoint; and delaying the decoding of the coded signals originating from the picture signals corresponding to the viewpoints except the base viewpoint relative to the decoding of the coded signal originating from the picture signal corresponding to the base viewpoint by time intervals equal to the recovered desired delay times.

3. A non-transitory computer program stored in a computer readable medium for decoding a coded multi-view video signal including coded signals resulting from encoding picture signals corresponding to different viewpoints respectively, wherein at least one among the viewpoints is designated as a base viewpoint, the base viewpoint corresponding to a picture signal which is encoded without referring to at least one picture signal corresponding to one of the viewpoints except the base viewpoint, and wherein the coded multi-view video signal contains coded information representing a desired delay time of the start of decoding a coded signal originating from each of the picture signals corresponding to the viewpoints except the base viewpoint relative to the start of decoding a coded signal originating from the picture signal corresponding to the base viewpoint, the computer program comprising the steps of:

decoding the coded information in the coded multi-view video signal to recover the desired delay times for the coded signals originating from the picture signals corresponding to the viewpoints except the base viewpoint;

decoding the coded signal originating from the picture signal corresponding to the base viewpoint;

decoding the coded signals originating from the picture signals corresponding to the viewpoints except the base viewpoint; and delaying the decoding of the coded signals originating from the picture signals corresponding to the viewpoints except the base viewpoint relative to the decoding of the coded signal originating from the picture signal corresponding to the base viewpoint by time intervals equal to the recovered desired delay times.

4. A method of decoding a coded multi-view video signal including coded signals resulting from encoding picture signals corresponding to different viewpoints respectively, wherein at least one among the viewpoints is designated as a base viewpoint, the base viewpoint corresponding to a picture signal which is encoded without referring to at least one picture signal corresponding to one of the viewpoints except the base viewpoint, and wherein the coded multi-view video signal contains coded information about view dependencies representing which of the picture signals are referred to as reference signals for the encoding of each of the picture signals, the method comprising the steps of:

decoding the coded information in the coded multi-view video signal to recover the view dependencies;

computing a desired delay time of the start of decoding a coded signal originating from each of the picture signals corresponding to the viewpoints except the base viewpoint relative to the start of decoding a coded signal originating from the picture signal corresponding to the base viewpoint in response to the recovered view dependencies;

decoding the coded signal originating from the picture signal corresponding to the base viewpoint;

decoding the coded signals originating from the picture signals corresponding to the viewpoints except the base viewpoint; and delaying the decoding of the coded signals originating from the picture signals corresponding to the viewpoints except the base viewpoint relative to the decoding of the coded signal originating from the picture signal corresponding to the base viewpoint by time intervals equal to the computed desired delay times.

* * * * *